United States Patent
Ishikawa et al.

(10) Patent No.: US 9,304,034 B2
(45) Date of Patent: Apr. 5, 2016

(54) MULTI-OPTICAL AXIS PHOTOELECTRIC SENSOR WITH A CASE BODY AND MOLDED END MEMBERS

(71) Applicant: Keyence Corporation, Osaka (JP)

(72) Inventors: Kaname Ishikawa, Osaka (JP); Katsunari Koyama, Osaka (JP); Cheah Lye Tatt, Osaka (JP)

(73) Assignee: Keyence Corporation, Osaka (JP)

( * ) Notice: Subject to any disclaimer, the term of this patent is extended or adjusted under 35 U.S.C. 154(b) by 35 days.

(21) Appl. No.: 14/279,359

(22) Filed: May 16, 2014

(65) Prior Publication Data

US 2014/0374580 A1    Dec. 25, 2014

(30) Foreign Application Priority Data

Jun. 21, 2013   (JP) .................. 2013-131190

(51) Int. Cl.
*G06M 7/00*     (2006.01)
*G01J 1/02*     (2006.01)
*G01V 8/20*     (2006.01)

(52) U.S. Cl.
CPC ....... *G01J 1/0271* (2013.01); *G01V 8/20* (2013.01)

(58) Field of Classification Search
CPC ........ G01V 8/20; G01J 1/0271; G08B 13/183
USPC ....................................... 250/221
See application file for complete search history.

(56) References Cited

U.S. PATENT DOCUMENTS

| | | | |
|---|---|---|---|
| 5,003,169 A | 3/1991 | Sakaguchi et al. | |
| 6,111,995 A | 8/2000 | Iwasaki et al. | |
| 6,140,633 A | 10/2000 | Iwasaki et al. | |
| 6,774,352 B2 | 8/2004 | Koyama et al. | |
| 6,784,415 B2 | 8/2004 | Kudo et al. | |
| 7,122,782 B2 | 10/2006 | Sakaguchi | |
| 7,485,841 B2 | 2/2009 | Inoue et al. | |
| 7,550,708 B2 | 6/2009 | Deguchi | |
| 8,487,236 B2 | 7/2013 | Tagashira | |
| 2008/0179505 A1 | 7/2008 | Inoue et al. | |
| 2009/0001298 A1* | 1/2009 | Deguchi ................ | 250/573 |
| 2011/0226938 A1 | 9/2011 | Tagashira | |
| 2013/0270423 A1 | 10/2013 | Kawabata et al. | |

FOREIGN PATENT DOCUMENTS

| | | |
|---|---|---|
| JP | 08-045400 | 2/1996 |
| JP | 2006-107797 | 4/2006 |
| JP | 2011-216372 | 10/2011 |

* cited by examiner

*Primary Examiner* — Thanh Luu

(74) *Attorney, Agent, or Firm* — Kilyk & Bowersox, P.L.L.C.

(57) ABSTRACT

Provided is a multi-optical axis photoelectric sensor that can achieve downsizing and weight reduction. The multi-optical axis photoelectric sensor includes a case body which is formed to have open ends and has the same cross-sectional shape in a longitudinal direction of the multi-optical axis photoelectric sensor; end members which are attached to one end and the other end of the case body and each formed of a molded article for closing an opening on each of the ends; and an optical component which is arranged from one end to the other end of the case body so as to be separated from an inner face of the case body. The optical component has a function of defining the spread angle of each optical axes. The optical component and the end members are directly or indirectly physically engaged with each other to unrotatably position the optical component by the end members.

18 Claims, 27 Drawing Sheets

MULTI-OPTICAL AXIS PHOTOELECTRIC SENSOR WITH A CASE BODY AND MOLDED END MEMBERS

CROSS-REFERENCE TO RELATED APPLICATIONS

The present application claims foreign priority based on Japanese Patent Application No. 2013-131190, filed Jun. 21, 2013, the contents of which is incorporated herein by reference.

BACKGROUND OF THE INVENTION

1. Field of the Invention

The present invention relates to a multi-optical axis photoelectric sensor.

2. Description of Related Art

A multi-optical axis photoelectric sensor is used as a safety device to monitor entry into a hazard area. A multi-optical axis photoelectric sensor has a plurality of internal light projecting elements or light receiving elements. Further, as a member for defining a spread angle of each optical axis (a spread angle of detection light) of these optical elements, an optical component including a lens or the like is disposed for each optical axis (JP 8-45400 A, JP 2011-216372 A, and JP 2006-107797 A, for example).

JP 8-45400 A discloses a multi-optical axis photoelectric sensor that employs a long body case which is a resin molded article. Specifically, the body case as a resin molded article has a detection window for each optical axis, and a lens member is bonded to the detection window. Further, optical elements (light receiving elements or light projecting elements) are mounted on a substrate which is housed in the body case and extends in the longitudinal direction. The sensor disclosed in JP 8-45400 A can be referred to as a multi-optical axis photoelectric sensor with a relatively simple configuration because an optical component thereof includes only lenses. In the body case disclosed in JP 8-45400 A, the back face side thereof is largely open, and a cover plate is attached to the back face side of the body case after internal components are housed inside the body case. JP 8-45400 A discloses attaching a reinforcement member to the multi-optical axis photoelectric sensor for preventing the warpage thereof. The reinforcement member is a molded article formed by press-processing, for example, a zinc-coated steel plate. The reinforcement member has a length dimension extending from one end to the other end of the multi-optical axis photoelectric sensor. The reinforcement member is fixed to the body case.

JP 2011-216372 A discloses a multi-optical axis photoelectric sensor that has an elongated case body which is a synthetic resin molded article. The multi-optical axis photoelectric sensor of JP 2011-216372 A includes a substrate which has a length extending over the entire area of a box-like case body which is open forward. Optical elements (light projecting elements or light receiving elements) and an optical component including lenses are mounted on the substrate. Further, the optical element substrate is surrounded by a reinforcement member which is made of a metal such as an aluminum alloy, and housed in the case body. The both ends and both sides in the longitudinal direction of the optical element substrate are fixed to the reinforcement member, and some parts of the optical element substrate are fastened to the reinforcement member with screws. A power cable is connected to the optical element substrate. The power cable extends outward from an end of the case body. A cover which is made of a light transmissive synthetic resin is laser-welded to the front opening of the box-like case body.

JP 2006-107797 A discloses a relatively robust multi-optical axis photoelectric sensor. A case of the multi-optical axis photoelectric sensor of JP 2006-107797 A includes an elongated metallic case body having a U-shaped cross section, end caps which block both ends of the case body, and a transparent plastic plate which covers a front opening of the case body. An internal optical component housed in the case is unitized based on a unit of optical axis. Each unit includes a package optical IC in addition to a member for restricting the spread angle of an optical axis and a lens. The one-optical axis optical units are assembled to a support frame side by side.

A multi-optical axis photoelectric sensor is a safety device. Therefore, there has been proposed one that defines the spread angle only by lenses as in the multi-optical axis photoelectric sensor of JP 8-45400 A. However, an object of the regulation is the spread angle of detection light of the multi-optical axis photoelectric sensor. Therefore, a general multi-optical axis photoelectric sensor is provided with not only lenses, but also an optical component for defining the spread angle of detection light. In a multi-optical axis photoelectric sensor that has an internal optical component, as can be seen in JP 2011-216372 A and JP 2006-107797 A, a structure for positioning the optical component is required.

In the multi-optical axis photoelectric sensor of JP 2011-216372 A, there is employed the structure in which the optical element substrate on which the optical component is mounted is surrounded by the reinforcement member which is made of a metal such as aluminum and positioned on the case body which is formed in a box-like shape and made of a synthetic resin, and housed in the case body.

In the multi-optical axis photoelectric sensor of JP 2006-107797 A, the case body which is a metallic extrusion-molded article having a U shape cross section. Further, there is employed the structure in which the optical units each in the unit of one optical axis including optical elements are positioned on the support flame with being arranged side by side, and housed in the case body.

The larger the number of optical axes in a multi-optical axis photoelectric sensor is, the longer the multi-optical axis photoelectric sensor becomes. Therefore, a problem of warpage of a case body becomes more serious. Therefore, as can be seen in JP 2011-216372 A and JP 2006-107797 A, a reinforcement member or a support frame for substantially positioning an optical component is an important element. However, such element is an obstructive factor against downsizing and weight reduction of a multi-optical axis photoelectric sensor.

SUMMARY OF THE INVENTION

It is an object of the present invention to provide a multi-optical axis photoelectric sensor that can relatively easily achieve downsizing and weight reduction.

It is another object the present invention to provide a multi-optical axis photoelectric sensor that employs a case body of an extrusion-molded article and can achieve downsizing and weight reduction.

It is yet another object the present invention to provide a multi-optical axis photoelectric sensor that employs a case body of an extrusion-molded article made of a synthetic resin and can achieve downsizing and weight reduction.

According to the present invention, the above technical objects are achieved by providing a multi-optical axis photoelectric sensor including:

a plurality of optical axes arranged at a predetermined pitch;

a case body formed to have an open first end and an open second end, the case body having the same cross-sectional shape in a longitudinal direction of the multi-optical axis photoelectric sensor;

end members attached to the first end and the second end of the case body and each formed of a molded article for closing an opening on each of the first and second ends; and an optical component for defining a spread angle of each of the optical axes, the optical component being arranged from the first end to the second end of the case body so as to be separated from an inner face of the case body, wherein the optical component and the end members are directly or indirectly physically engaged with each other to unrotatably position the optical component by the end members, and a reference for positioning the optical axes is the end members.

In a preferred embodiment of the present invention, the case body is an extrusion-molded article made of a synthetic resin. Most preferably, the case body has a closed cross section. Typically, the case body has a generally rectangular cross-sectional shape having two long sides facing each other and two short sides facing each other, and grooves are formed on end parts of the two long sides.

In a preferred embodiment of the present invention, the optical component includes a plurality of optical units, and each of the optical units has a plurality of optical axes. These optical units are supported by a rigid member. Typically, the rigid member includes a frame formed of a metal plate formed into a three-dimensional shape. The frame continuously extends from one end part to the other end part of the multi-optical axis photoelectric sensor.

The other objects and effects of the present invention will be apparent from the following detailed description of an embodiment.

DETAILED DESCRIPTION OF PREFERRED EMBODIMENT

Embodiment

Hereinbelow, a preferred embodiment of the present invention will be described on the basis of the accompanying drawings.

Figure 1:
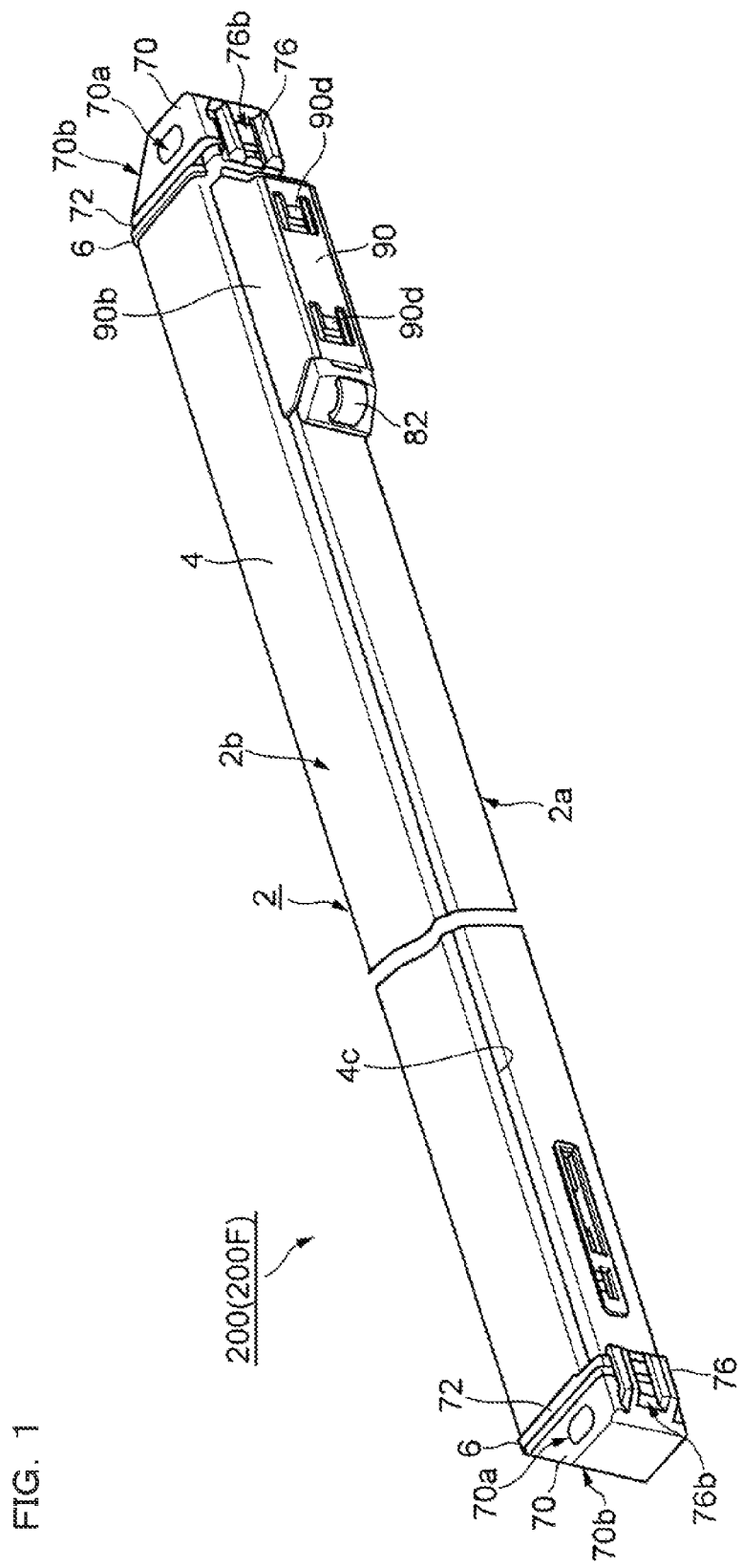
FIG. 1 is a perspective view of a flat type multi-optical axis photoelectric sensor of an embodiment.
Figure 2:
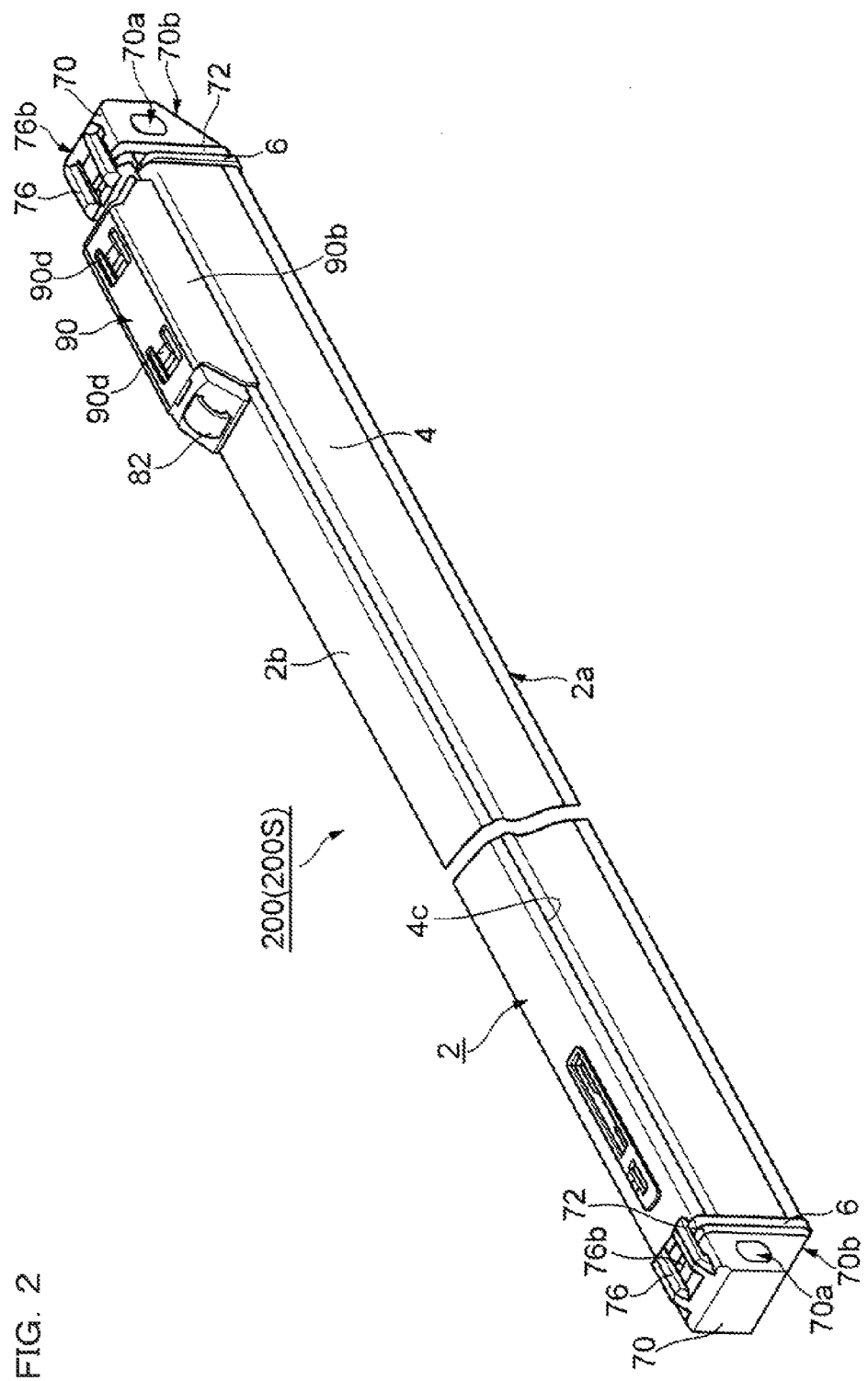
FIG. 2 is a perspective view of a slim type multi-optical axis photoelectric sensor of the embodiment.

Referring to FIGS. 1 and 2, a multi-optical axis photoelectric sensor 200 of the embodiment includes a case 2 as a basic element. Two types of sensors 200F (FIG. 1) and 200S (FIG. 2) are manufactured using cases 2 having a common basic configuration.

As can be seen from FIGS. 1 and 2, the case 2 has an elongated shape having a generally rectangular cross section. The first sensor 200F of FIG. 1 uses a relatively wide face corresponding to the long side of the rectangle as a light projecting/receiving face 2a. The second sensor 200S uses a relatively narrow face corresponding to the short side of the rectangle as a light projecting/receiving face 2a. In FIGS. 1 and 2, the first sensor 200F and the second sensor 200S are illustrated with the light projecting/receiving faces 2a facing downward and back faces 2b facing upward.

In comparison between FIG. 1 and FIG. 2, when viewing the light projecting/receiving faces 2a of the first sensor 200F (FIG. 1) and the second sensor 200S from the front, the first sensor 200F of FIG. 1 has an outer shape with a wide width and a shallow depth. Therefore, the first sensor 200F illustrated in FIG. 1 is called "flat type sensor". On the other hand, the second sensor 200S of FIG. 2 has an outer shape with a narrow width and a deep depth in a front view. Therefore, the second sensor 200S illustrated in FIG. 2 is called "slim type sensor".

Figure 3:
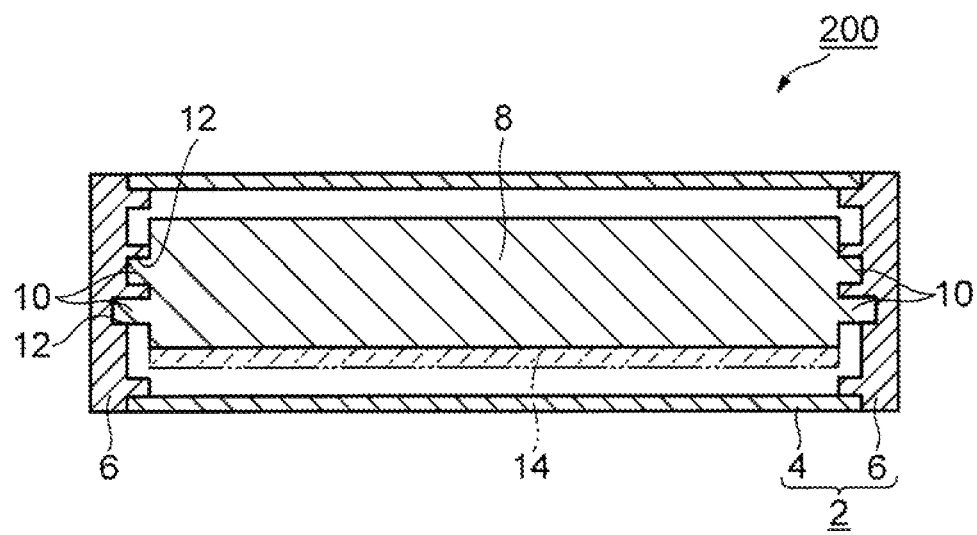
FIG. 3 is a diagram for explaining a typical example of a function included in the embodiment.
Figure 4:
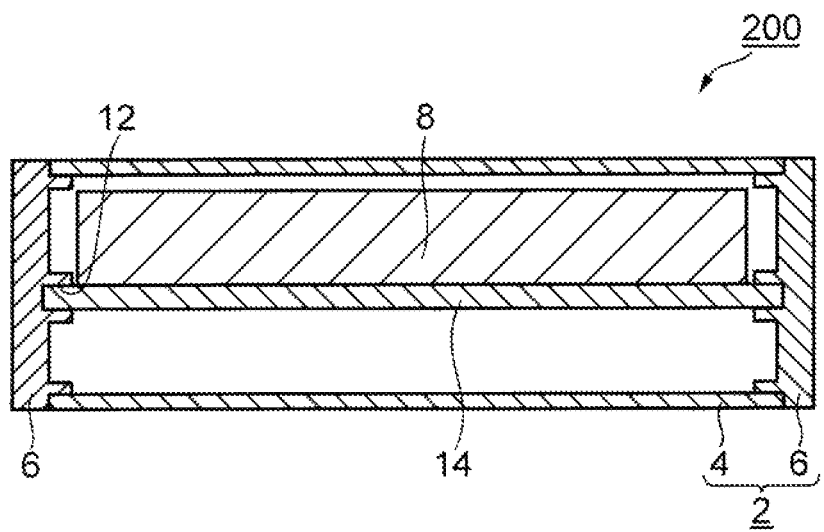
FIG. 4 is a diagram for explaining another typical example of the function included in the embodiment.

FIGS. 3 and 4 are diagrams for explaining typical examples of functions included in the multi-optical axis photoelectric sensor 200 of the embodiment. Referring to FIGS. 3 and 4, the case 2 of the multi-optical axis photoelectric sensor 200 generally includes a case body 4 which is an extrusion-molded article and end members 6 which close both end openings of the case body 4. An optical component 8 for defining a spread angle of each optical axis of the multi-optical axis photoelectric sensor 200 is unitized. Using a single or a plurality of optical units, various types of multi-optical axis photoelectric sensors 200 having different number of optical axes are manufactured such that some have a relatively small number of optical axes while others have a relatively large number of optical axes. A plurality of optical axes included in the multi-optical axis photoelectric sensor 200 are arranged at fixed intervals in the longitudinal direction of the multi-optical axis photoelectric sensor 200 from one end part to the other end part of the multi-optical axis photoelectric sensor 200. Typically, the optical axes are arranged in a row. Light projecting elements or light receiving elements, namely, optical elements of the respective axes of the multi-optical axis photoelectric sensor 200 may constitute a part of the optical component 8. Alternatively, for example, a substrate (not illustrated) on which the optical elements are mounted and that is independent of the optical component 8 may be arranged in adjacent to the optical component 8.

In the multi-optical axis photoelectric sensor 200 of the embodiment, a reference for positioning the optical component 8 is the end members 6. That is, each of the optical axes of the multi-optical axis photoelectric sensors 200 is positioned using the end members 6 as the reference. In order to achieve the positioning, as can be easily understood from FIG. 3, the end members 6 and the optical component 8 are relatively unrotatably recess-projection fitted with each other. In the recess-projection fitting, the end members 6 and the optical component 8 are insertable and removable in the longitudinal direction of the case 2, that is, displaceable in the longitudinal direction of the case 2. In FIG. 3, reference sign 10 denotes a projection, and reference sign 12 denotes a recess. In the illustrated example, the optical component 8 has projections 10 on end faces thereof. On the other hand, each of the end members 6 has the recesses 12.

Of course, the optical component 8 may have recesses 12, and the end members 6 may have projections 10. Further, the optical component 8 may have projections 10 and recesses 12, and complementary recesses 12 and complementary projections 10 may be provided in the end members 6 so as to fit the projections 10 and the recesses 12 of the optical component 8, respectively, in order to restrict the rotation of the optical component 8. Further, a plurality of recess-projection fittings may be employed in order to prevent the relative rotation between the end members 6 and the optical component 8. If a single recess-projection fitting is employed, cross-sectional shapes of the complementary projection 10 and recess 12 are preferably non-circular shapes.

The above recess-projection fitting is not limited to fitting with no allowance. For example, when a plurality of recess-projection fittings are utilized, some may be loosely fitted with some allowance, and others may be fitted with no allowance. A typical example of the fitting with no allowance is a so-called positioning pin. The positioning pin may be employed for restricting the rotation of the optical component 8 with respect to the end members 6.

Positioning of the optical component 8 in the longitudinal direction is not necessarily essential. However, it is preferred to achieve a mechanical configuration for restricting the displacement in the longitudinal direction of the optical component 8 by designing the optical component 8 and the end members 6 such that, for example, a part of the end of the optical component 8 is allowed to abut on the end member 6.

The end members 6 which serve as a reference for positioning the optical axis are molded articles. The material of the end members 6 may be a synthetic resin, or may also be a metal such as an aluminum alloy.

A virtual line 14 illustrated in FIG. 3 indicates a rigid member. The rigid member 14 typically includes a metallic bar member, or a metallic frame that is formed in a three-dimensional shape. In order to achieve weight reduction and downsizing, for example, the frame is preferably a metal plate which is press-molded into a three-dimensional shape having a generally L-shaped cross section, a generally C-shaped cross section, or the like. The rigid member 14 extends from one end part to the other end part of the multi-optical axis photoelectric sensor 200. When the rigid member 14 is employed, the optical component 8 is fixed to the rigid member 14 with being positioned on the rigid member 14.

As can be understood from the above description, in the example of FIG. 3, the optical component 8 is directly positioned with respect to the end members 6, and the rotation of the optical component 8 is thereby restricted. Preferably, the rigid member 14 is employed as a support member for the optical component 8. As a modification, the ends of the rigid member 14 may be fixed to the respective end members 6, and the optical component 8 may be positioned on the rigid member 14 as illustrated in FIG. 4. Accordingly, it is possible to position the optical component 8 with respect to the end members 6 through the rigid member 14 to thereby restrict the rotation of the optical component 8. Further, both of the rigid member 14 and the optical component 8 may be unrotatably positioned with respect to the end members 6.

The case body 4 is an extrusion-molded article as described above. The material of the case body 4 may be a metal (typically, an aluminum alloy), or may also be a synthetic resin (polycarbonate) or FRP. In the case body 4 in the embodiment, an amorphous resin is employed such as an acrylic resin, a polyarylate resin, polycarbonate, polystyrene (PST), and polyethersulfone (PES). In particular, since a polyarylate resin is a chemical-resistant resin having a high light transmittance (approximately 90%), the polyarylate resin is preferably employed as the material of the case body 4. Further, the cross-sectional shape of the case body 4 may be an open cross-sectional shape such as a U shape, or may also be a closed cross-sectional shape, namely, a hollow cross-sectional shape as will be described later.

In an extrusion molding method, it is difficult to ensure a high level of precision of a molded article. Therefore, it is desirable to design the multi-optical axis photoelectric sensor 200 so as to prevent the optical component 8 incorporated into the case body 4 from directly making contact with the case body 4. In other words, it is preferable that the multi-optical axis photoelectric sensor 200 is designed such that the inner face of the case body 4 and the optical component 8 which is housed inside the case body 4 be separated from each other. The meaning of the term "separated" does not exclude a configuration in which a cushion material or an adhesive such as a double-sided adhesive tape is partially interposed between the optical component 8 and the case body 4. As a support structure in an intermediate part of the elongated optical component 8, a cushion material or a resilient material may be arranged between the optical component 8 or the frame (rigid member 14) and the case body 4.

For example, when an extrusion-molded article having an open cross-sectional shape such as a U cross-sectional shape is employed as the case body 4, a light-transmissive plate which constitutes a light projecting/receiving window thereof is liquid-tightly joined to the case body 4 typically using an adhesive. The adhesion region is called "waterproof line (ingress protection (IP) line)" in this industrial field. On the other hand, when an extrusion-molded article having a closed cross-sectional shape is employed as the case body 4, the multi-optical axis photoelectric sensor 200 can be referred to as a sensor with no IP line for a front cover (detection light passage window member). Employing the case structure with no IP line for a front cover (detection light passage window member) eliminates the necessity of employing the structure for waterproof measures. Therefore, it is possible to achieve downsizing of the sensor.

Figure 5:
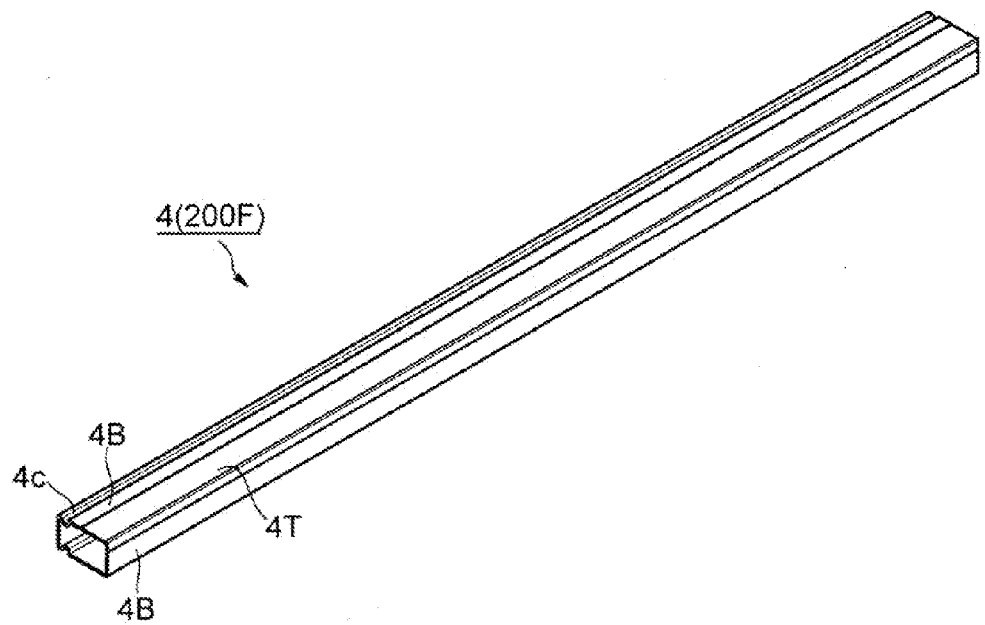
FIG. 5 is a perspective view of a case body which is an element of the flat type multi-optical axis photoelectric sensor of the embodiment.
Figure 6:
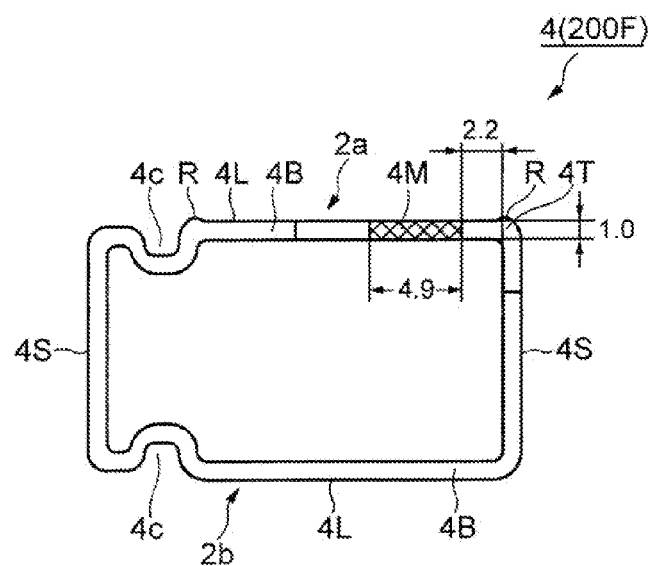
FIG. 6 is an end face view of the case body illustrated in FIG. 5.
Figure 7:
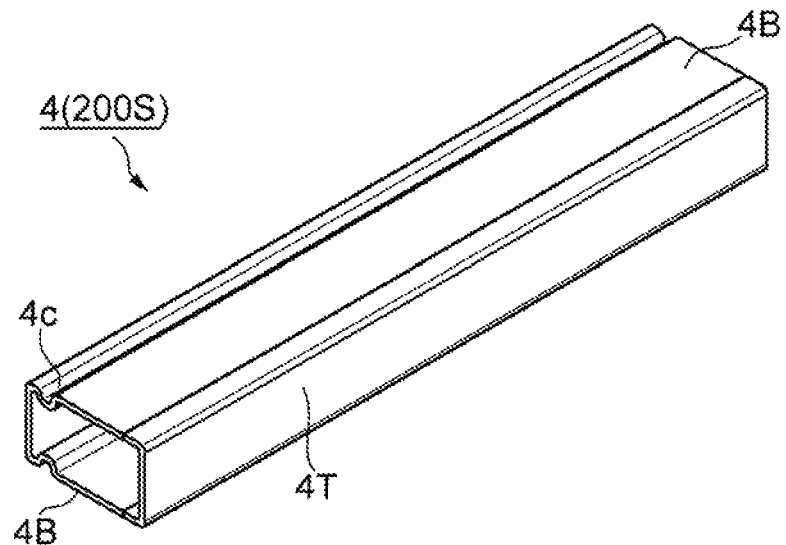
FIG. 7 is a perspective view of a case body which is an element of the slim type multi-optical axis photoelectric sensor of the embodiment.
Figure 8:
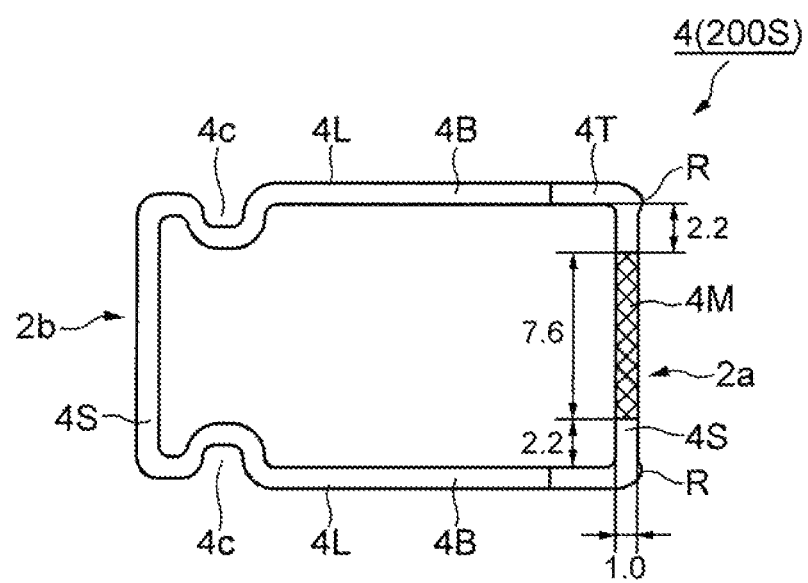
FIG. 8 is an end face view of the case body illustrated in FIG. 7.

Case Body (FIGS. 5 to 8):

Referring back to FIGS. 1 and 2, in the multi-optical axis photoelectric sensor 200, an extrusion-molded article having a closed cross-sectional shape is employed as the case body 4. FIGS. 5 and 6 illustrate a case body 4 used in the flat type sensor 200F illustrated in FIG. 1. FIGS. 7 and 8 illustrate a case body 4 used in the slim type sensor 200S illustrated in FIG. 2. The end face shape and the size of the cross section of the case body 4 employed in the flat type sensor 200F are basically the same as those of the case body 4 employed in the slim type sensor 200S as can be understood well by comparing FIG. 6 with FIG. 8 as the end face diagrams.

As with a conventional multi-optical axis photoelectric sensor, in the multi-optical axis photoelectric sensor 200 of the embodiment, sensors having different number of optical axes are manufactured by preparing a plurality of kinds of case bodies 4 having different length dimensions. When comparing FIG. 5 with FIG. 7, the length dimension of the case body 4 illustrated in FIG. 5 is longer than that of the case body 4 illustrated in FIG. 7. However, this is not essential. FIG. 5 merely illustrates the case body 4 of the flat type multi-optical axis photoelectric sensor 200F having a relatively large number of optical axes. The length dimension of the case body 4 of the flat type sensor 200F and the length dimension of the case body 4 of the slim type sensor 200S are substantially equal to each other when a pitch between optical axes (hereinbelow, referred to as an optical axis pitch) and the number of optical axes of the flat type sensor 200F are equal to those of the slim type sensor 200S.

First, the case body 4 of the flat type sensor 200F will be described with reference to FIGS. 5 and 6. The closed cross-sectional shape of the case body 4 is a generally rectangular shape. Specifically, when viewing the end face thereof, the case body 4 has two short sides 4S which are positioned facing each other and extend straight in parallel to each other, and two long sides 4L which positioned facing each other and, basically, extend straight in parallel to each other. Each of the long sides 4L has a groove 4c on one end part in the cross-sectional shape. Due to the paired grooves 4c, the case body 4 has a cross-sectional shape being deformed compared to a geometric shape having a quadrangular cross section with slightly rounded corners. The right and left grooves 4c, 4c may be symmetrically positioned, or may also be asymmetrically positioned.

The case body 4 includes a visible light transmissive portion 4T which is made of a transparent synthetic resin material (polyarylate resin) and a light blocking portion 4B which is made of a colored synthetic resin material (polyarylate resin with a pigment). That is, the case body 4 is a molded article formed by two-color molding. Of course, the case body 4 may be extrusion-molded using one kind of light transmissive resin material, and a coating material may be thereafter applied thereto to form the light blocking potion 4B.

As can be best understood from FIG. 6, the visible light transmissive portion 4T is, in the cross section, formed in one of the long sides 4L on a corner that is far from the groove 4c, and extends from an intermediate part of the long side 4L to an end part of the short side 4S. Further, an intermediate part of the visible light transmissive portion 4T is a detection light passage portion 4M for projecting/receiving light. In the intermediate part, namely, the detection light passage portion 4M, two facing surfaces defining the detection light passage portion 4M are smooth surfaces which are parallel to each other (that is, the detection light passage portion 4M has a uniform thickness) and extend straight.

Reference sign R illustrated in FIGS. 6 and 8 denotes a rib which extends in the longitudinal direction. Referring to FIG. 6, the case body 4 of the flat type sensor (200F) has two ribs R which are positioned on both sides of the detection light passage portion 4M in the long side 4L. Referring to FIG. 8, the case body 4 of the slim type sensor (200S) has two ribs R which are positioned on both sides of the detection light passage portion 4M in the short side 4S. In this manner, by forming the ribs R on both sides of the detection light passage portion 4M with the detection light passage portion 4M interposed therebetween, when some object collides with the multi-optical axis photoelectric sensor 200, it is possible to prevent the detection light passage portion 4M from being damaged by the object directly colliding with the detection light passage portion 4M.

As described above, the detection light passage portion 4M, namely, a part of the multi-optical axis photoelectric sensor 200F through which detection light passes exists in the intermediate part of the transparent visible light transmissive portion 4T. In other words, the design is made so that the detection light passage portion 4M is positioned in the part that is separated from two boundaries between the transparent visible light transmissive portion 4T and the colored light blocking portion 4B. Therefore, when extrusion-molding the case body 4, a colored synthetic resin material is not mixed into the detection light passage portion 4M.

Further, "4.9" illustrated in FIG. 6 indicates the width dimension of the detection light passage portion 4M. Therefore, the width of the detection light passage portion 4M is 4.9 mm. In addition, "2.2" indicates that the dimension between the detection light passage portion 4M and the corner of the case body 4 is 2.2 mm. Further, "1.0" indicates the thickness dimension of the detection light passage portion 4M. Therefore, the thickness dimension of the detection light passage portion 4M is 1.0 mm. As will be understood by a person skilled in the art, a thickness dimension of, for example, 1.3 mm or less, in particular, the thickness dimension of 1.0 mm of the detection light passage portion 4M in the present embodiment is as thin as the limit thickness that enables to ensure molding precision of the detection light passage portion 4M in the extrusion molding. The thin case body 4 has a generally rectangular cross section. However, the shape of the generally rectangular cross section is deformed by arranging the pair of grooves 4c so as to face each other. The deformation can improve the rigidity of the case body 4.

Referring to FIGS. 7 and 8, as with the flat type sensor 200F described above (FIGS. 5 and 6), the case body 4 having a closed cross-sectional shape of the slim type sensor 200S includes a visible light transmissive portion 4T which is made of a transparent synthetic resin material and a light blocking portion 4B which is made of a colored synthetic resin material. However, as can be seen from FIGS. 7 and 8, in the case body 4 of the slim type sensor 200S, one of the short sides 4S separated from the grooves 4c has a part constituting the transparent visible light transmissive portion 4T. The visible light transmissive portion 4T extends through the corners of the case body 4 to the ends of the long sides 4L.

It should be noted that the width of the detection light passage portion 4M is 7.6 mm, and this width is wider than that of the detection light passage portion 4M of the flat type sensor F. In addition, the detection light passage portion 4M is arranged in an intermediate part of the short side 4S. Accordingly, when manufacturing the slim type sensor 200S, it is possible to use any one of the two long sides 4L as a reference for assembling an internal component (described later) thereto. That is, referring to FIG. 8, an internal component may be assembled by using the upper long side 4L as a reference. Alternatively, even when an internal component is assembled by using the lower long side 4L as a reference, a problem does not occur in projecting/receiving light.

In both of the flat type sensor 200F and the slim type sensor 200S, the shape of a part other than the detection light passage portion 4M in the case body 4, that is, the shape of a part other than the detection light passage portion 4M in the long sides 4L and the short sides 4S may be any shape. For example, the long sides 4L and the short sides 4S may have a curved shape, or may also have a wave shape. Of course, an area occupied by the multi-optical axis photoelectric sensor 200 can be reduced by employing the shape of the case body 4 as illustrated in FIGS. 5 to 8, namely, by forming the outer faces of the long sides 4L and the short sides 4S into flat faces. That is, it is possible to make the multi-optical axis photoelectric sensor 200 compact.

Figure 9:
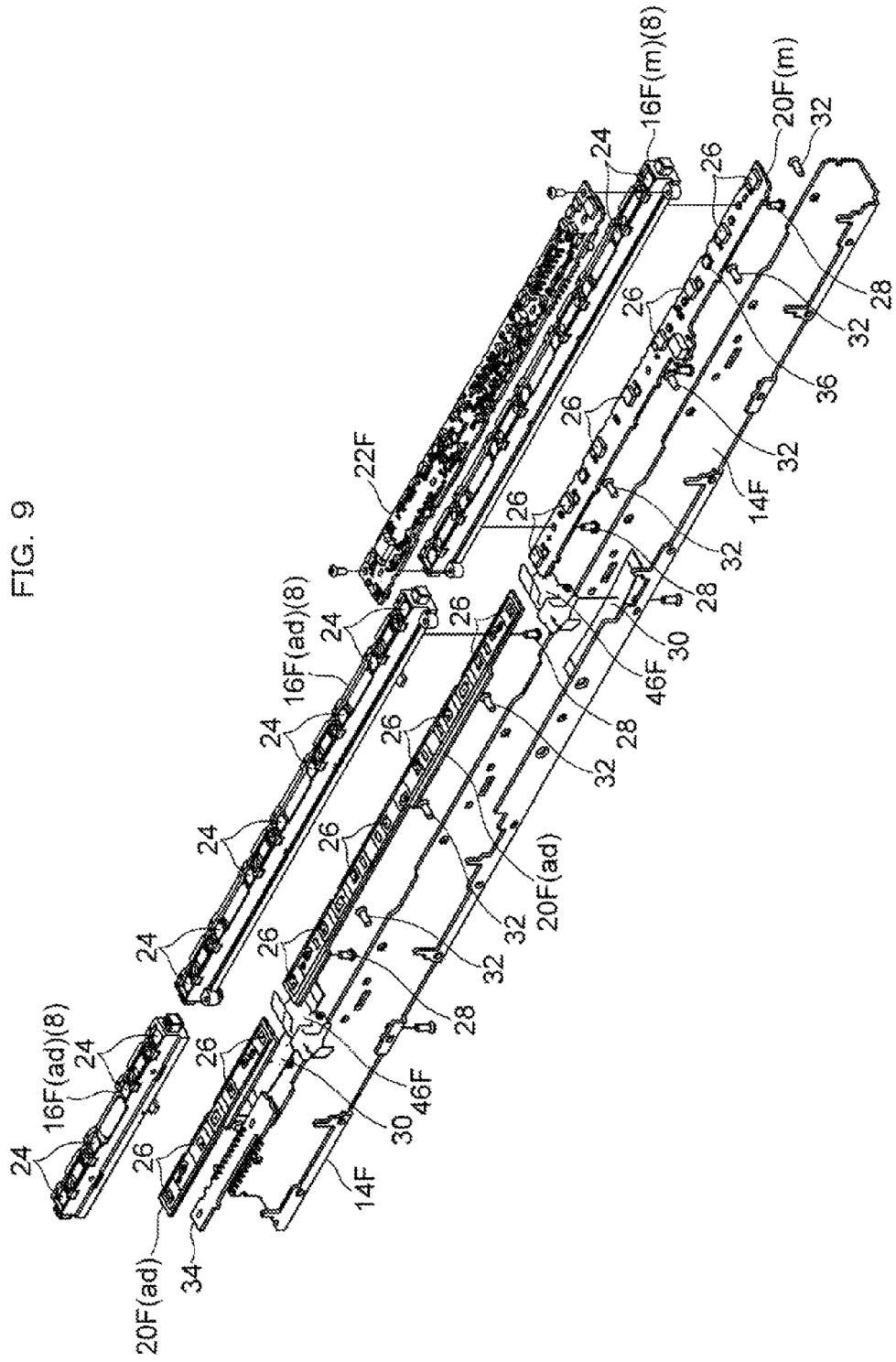
FIG. 9 is an exploded perspective view of internal components of the flat type multi-optical axis photoelectric sensor of the embodiment.
Figure 10:
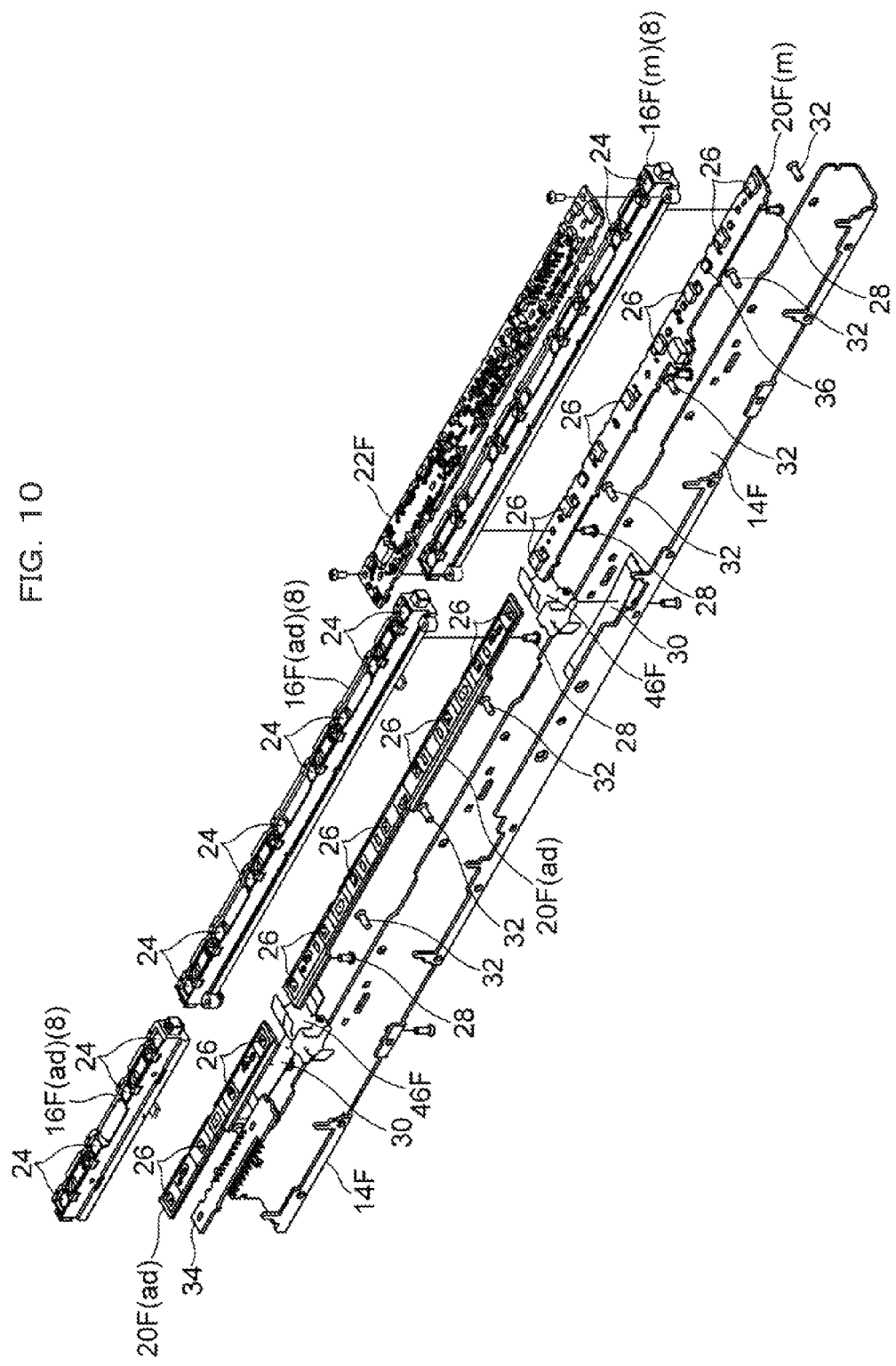
FIG. 10 is an exploded perspective view of internal components of the slim type multi-optical axis photoelectric sensor of the embodiment.

Internal Structure of Multi-Optical Axis Photoelectric Sensor 200 (FIGS. 9 and 10):

FIG. 9 illustrates the internal structure of the flat type sensor 200F. FIG. 10 illustrates the internal structure of the slim type sensor 200S. The internal structures of the flat type sensor 200F and the slim type sensor 200S are basically the same as each other. Therefore, common members are denoted by the same reference sign. Further, "F" is appended to members of the flat type sensor 200F, and "S" is appended to members of the slim type sensor 200S.

The multi-optical axis photoelectric sensor 200 of the embodiment includes the optical component 8 for generating an optical axis having a predetermined spread angle, an optical element substrate 20 which is fixed to the optical component 8, a main control board 22, and the frame 14 formed by press-molding a metal plate.

Figure 11:
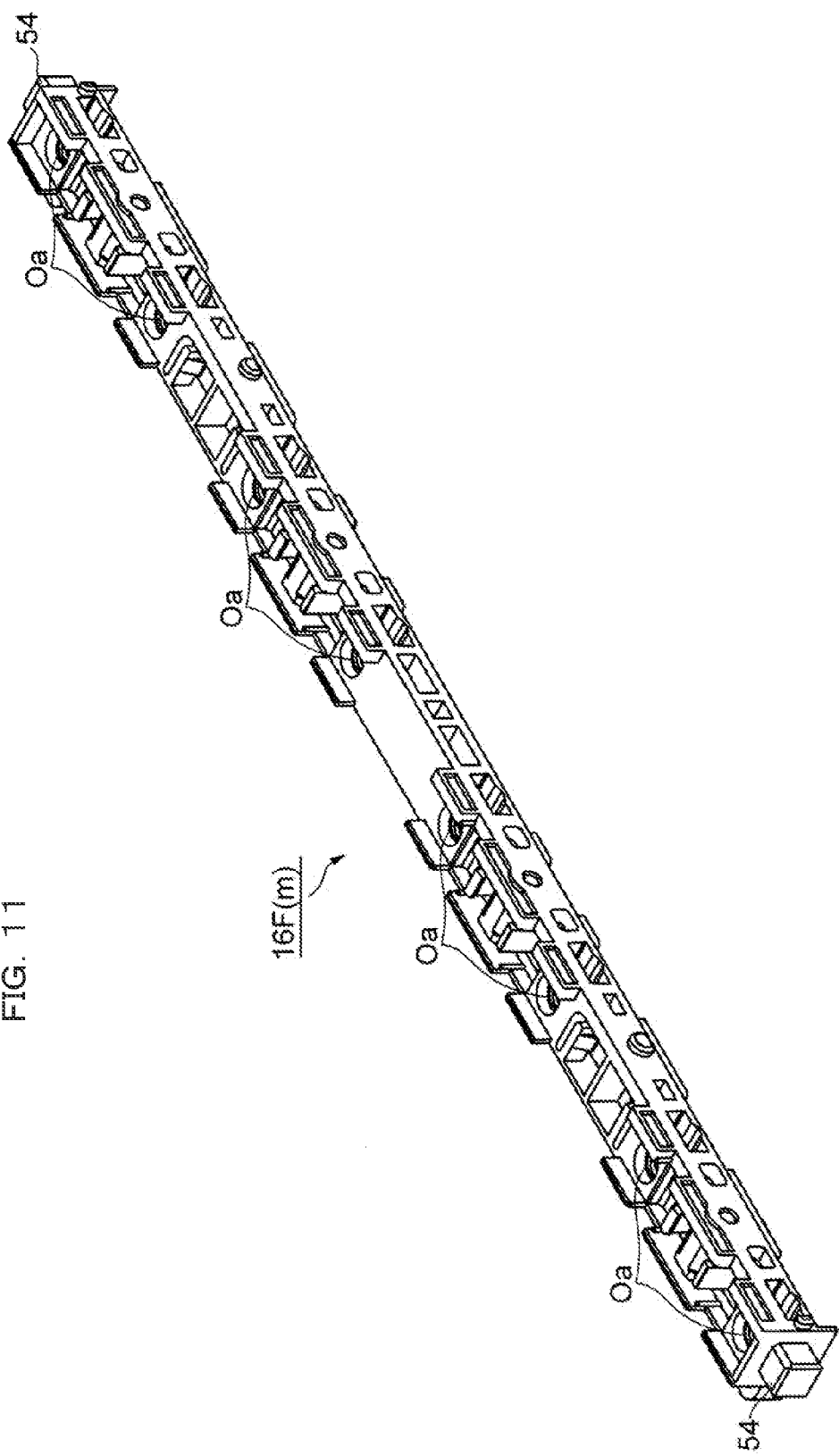
FIG. 11 is a perspective view of a main optical unit which is an element of the flat type multi-optical axis photoelectric sensor.
Figure 12:
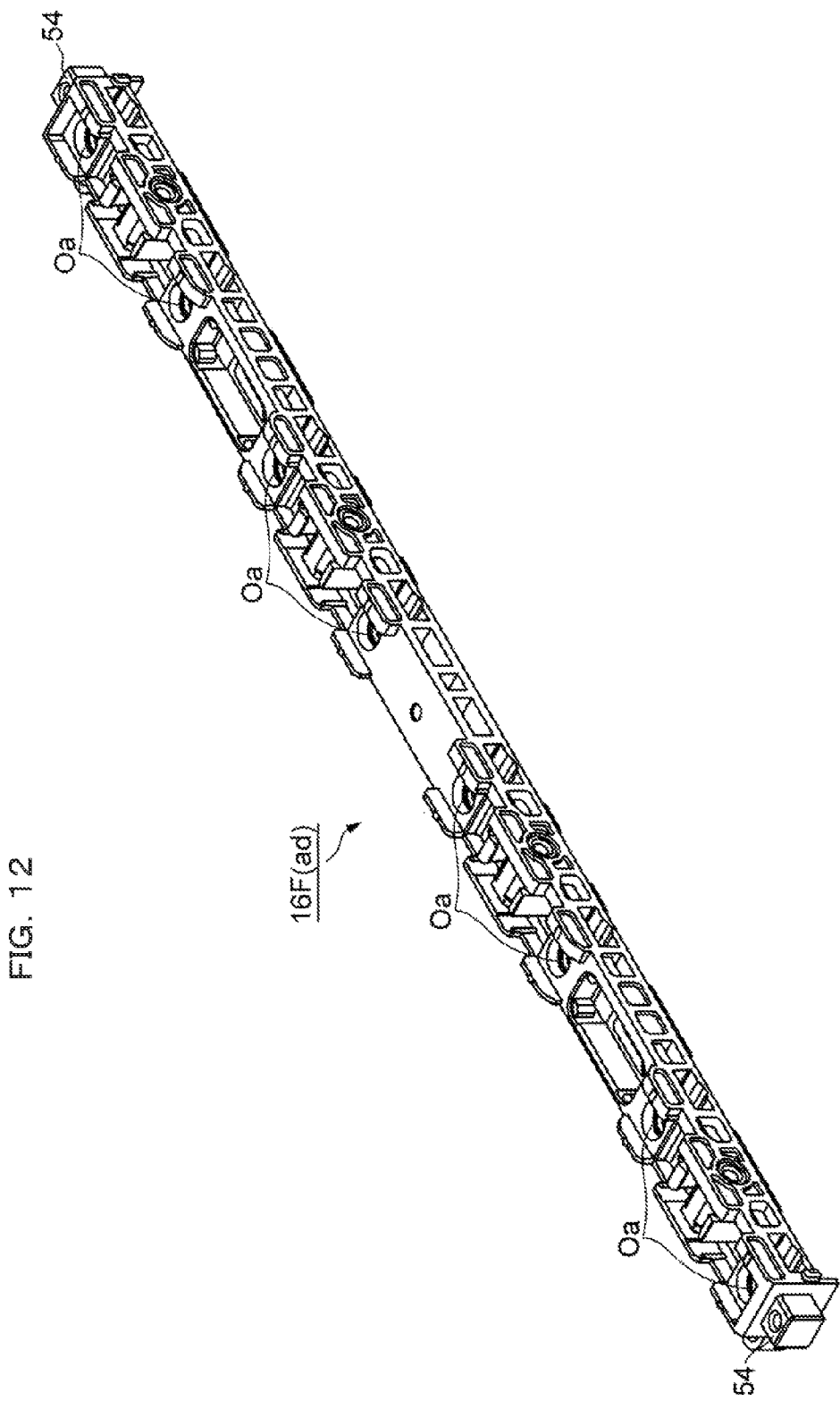
FIG. 12 is a perspective view of an additional optical unit which is an element of the flat type multi-optical axis photoelectric sensor.
Figure 13:
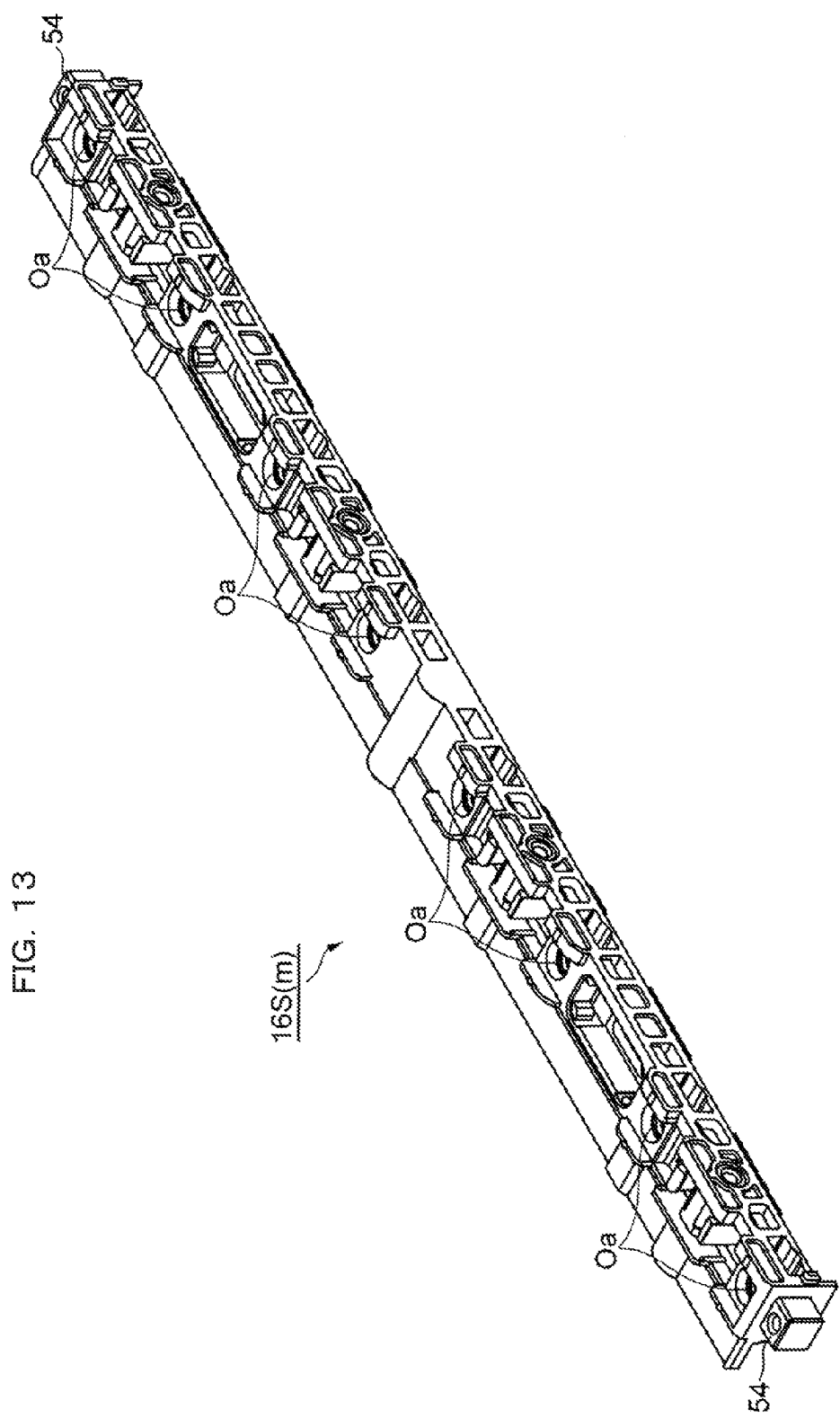
FIG. 13 is a perspective view of a main optical unit which is an element of the slim type multi-optical axis photoelectric sensor.
Figure 14:
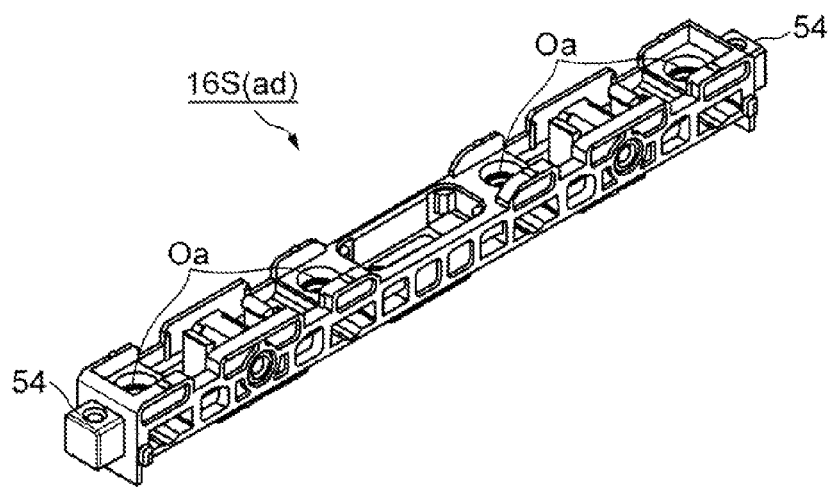
FIG. 14 is a perspective view of an additional optical unit which is an element of the slim type multi-optical axis photoelectric sensor.

Optical Unit 16 (FIGS. 11 to 14):

The optical component 8 described with reference to FIGS. 3 and 4 includes an optical unit 16. As the optical unit 16, an eight-optical axis unit and a four-optical axis unit are prepared. Of course, the number of optical axes of the optical unit 16 may be any number. The multi-optical axis photoelectric sensor 200 of the embodiment can be provided with a large number of optical axes by combining the eight-optical axis unit and the four-optical axis unit. Reference sign 24 denotes a lens. Optical axes Oa of the optical unit 16 are arranged in a row at equal intervals in the longitudinal direction. FIGS. 11 and 12 illustrate an optical unit 16F which is incorporated into the flat type sensor 200F. An optical unit 16F(m) illustrated in FIG. 11 is a main optical unit, and an optical unit 16F(ad) illustrated in FIG. 12 is an additional eight-optical axis unit. In addition, a four-optical axis unit is also prepared as the additional optical unit 16F(ad). FIGS. 13 and 14 illustrate an optical unit 16S which is incorporated into the slim type sensor 200S. An optical unit 16S(m) illustrated in FIG. 13 is a main optical unit, and an optical unit 16S(ad) illustrated in FIG. 14 is an additional four-optical axis optical unit. In addition, an eight-optical axis unit is also prepared as the additional optical unit 16S(ad). These optical units 16 of FIGS. 11 to 14 are units before lenses 24 are attached thereto.

Optical Element Substrate 20 (FIGS. 9 and 10):

The optical element substrate 20 includes a main element substrate 20(m), an additional element substrate 20(ad) for eight optical axes, and an additional element substrate 20(ad) for four optical axes. Depending on the number of optical axes of the multi-optical axis photoelectric sensor 200, the eight-axis additional element substrate 20(ad) and/or the four-optical axis additional element substrate 20(ad) is assembled thereto. Optical elements 26 each of which includes a light receiving element or a light projecting element are mounted on the optical element substrate 20. Also as the optical element substrate 20, the main optical element substrate 20(*m*) and the additional element substrate 20(*ad*) are prepared. The optical elements 26 are arranged in a row at equal intervals in the longitudinal direction of the multi-optical axis photoelectric sensor 200. The optical element substrate 20 is fixed to the optical component 8 with a screw 28. Further, in a plurality of optical element substrates 20, element substrates 20, 20 that are adjacent to each other are electrically connected to each other through a card electric wire 30.

Figure 15:
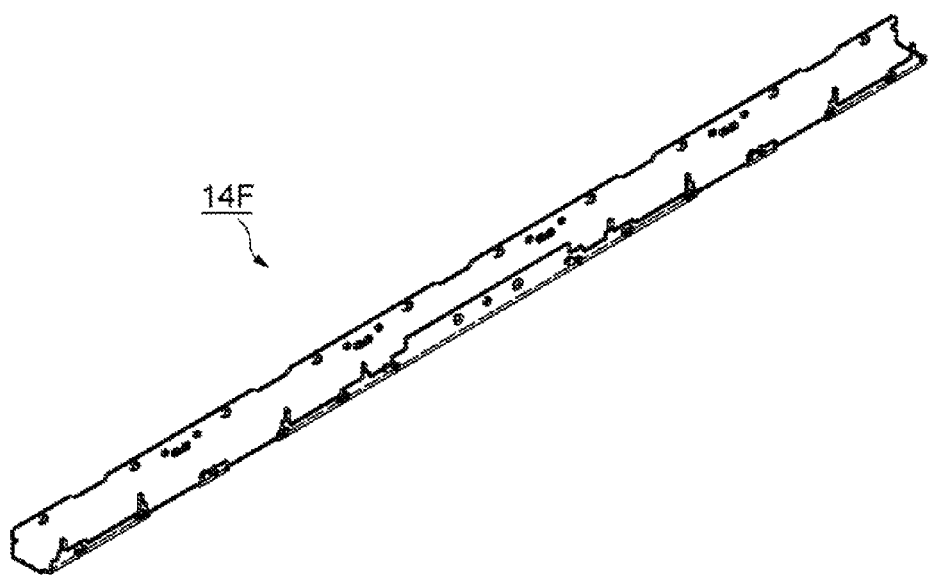
FIG. 15 is a perspective view of a rigid member (frame) which is an element of the flat type multi-optical axis photoelectric sensor.
Figure 16:
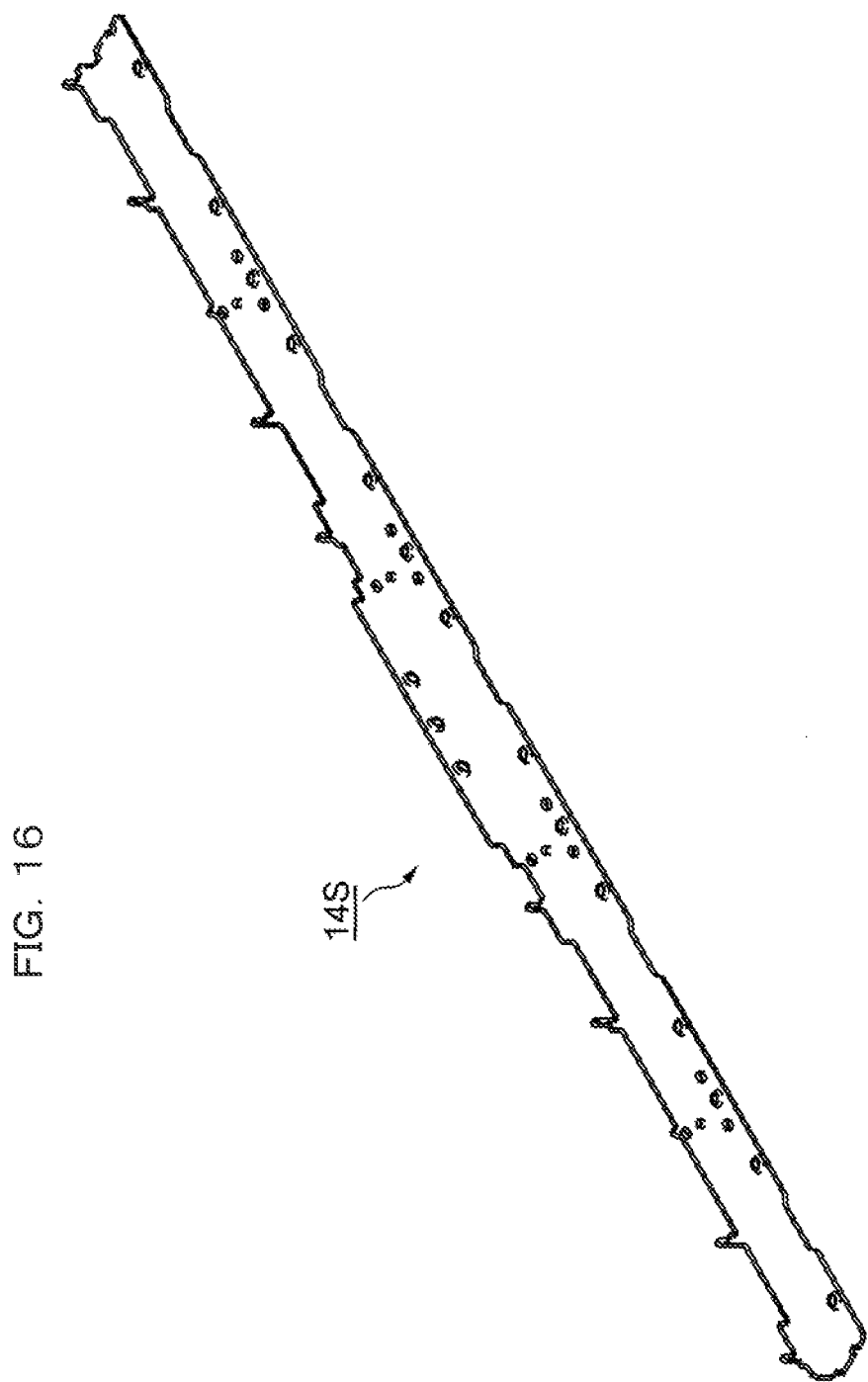
FIG. 16 is a perspective view of a rigid member (frame) which is an element of the slim type multi-optical axis photoelectric sensor.

Frame 14 (FIGS. 15 and 16)

Referring to FIGS. 15 and 16 in addition to FIGS. 9 and 10, as described above, the frame 14 has a three-dimensional shape which is formed by press-molding a metal plate. FIG. 15 illustrates a frame 14F of the flat type sensor 200F. The frame 14F has a generally L-shaped cross section. FIG. 16 illustrates a frame 14S of the slim type sensor 200S. The frame 14S has a generally L-shaped cross section. The frame 14 preferably has a length dimension that continuously extends from one end part to the other end part of the multi-optical axis photoelectric sensor 200. A dedicated frame 14 is prepared for each of the multi-optical axis photoelectric sensors 200 having different lengths.

The optical unit 16 described above is fixed to the frame 14 at a predetermined position using a countersunk head screw 32. By using the countersunk head screw 32, the optical unit 16 can be screw-fixed to the frame 14 with a screw head not protruding outward from an outer plate face of the frame 14. Accordingly, it is possible to reduce the separation distance between the frame 14 and the case body 4 into an extremely small dimension. Therefore, the cross-sectional area of the case body 4 can be reduced. That is, the usage of the countersunk head screw 32 can contributes to the downsizing of the multi-optical axis photoelectric sensor 200.

In the multi-optical axis photoelectric sensor 200 in which a plurality of optical components 8 are arranged in a row, every two adjacent optical units 16, 16 are fixed to the frame 14 with being separated from each other. Of course, a structure in which every two adjacent optical units 16, 16 are coupled to each other may be employed. The optical axis pitch of the multi-optical axis photoelectric sensor 200 is constant in both of the structure in which the optical units 16 are coupled to each other and the structure in which the optical units 16 are arranged with being separated from each other as in the embodiment.

The main control board 22 has a function of collectively controlling the multi-optical axis photoelectric sensor 200. The main control board 22 is screw-fixed to one end part of the frame 14 in adjacent to the main optical element substrate 20(*m*).

Referring to FIGS. 9 and 10, an extension connector substrate 34 is arranged on the other end part of the frame 14. Although the extension connector substrate 34 may be screw-fixed to the frame 14, the extension connector substrate 34 is soldered to the frame 14 in this embodiment. A connector 82 (FIG. 37) of an external cable 84 accesses the extension connector substrate 34. The extension connector substrate 34 is connected to another multi-optical axis photoelectric sensor 200 or a control device using the external cable 84. A typical example of connection using the cable 84 is as follows.

(1) A multi-optical axis photoelectric sensor 200 on a light projecting side and a counterpart multi-optical axis photoelectric sensor 200 on a light receiving side are connected to each other through the cable 84, and a light blocking signal is output to an external device from the light-receiving side multi-optical axis photoelectric sensor 200 though the cable 84.

(2) A plurality of light-projecting side sensors 200 are connected in series through the cable 84, and a plurality of light-receiving side sensors 200 are connected in series through the cable 84. Further, a light blocking signal is output to an external device from a head light-receiving side multi-optical axis photoelectric sensor 200 through the cable 84.

Each of display light emitting elements 36 is mounted between corresponding optical elements 26 on the optical element substrate 20. The display light emitting elements 36 are arranged on the row of the optical elements 26. However, the display light emitting elements 36 may be arranged so as to be offset from the row of the optical elements 26.

Figure 17:
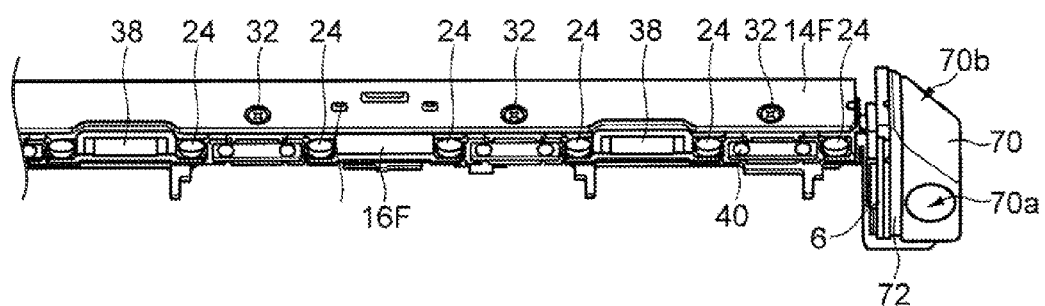
FIG. 17 is a diagram illustrating the optical unit, the frame, and an end member of the flat type sensor in which illustration of the case body and a main control board is omitted.
Figure 18:
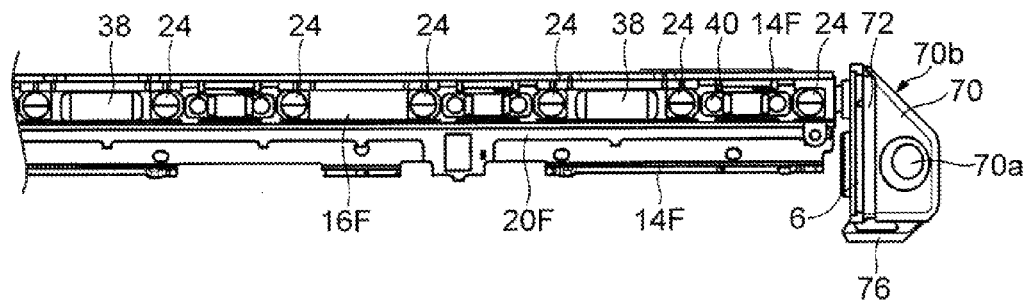
FIG. 18 is a front view of the optical unit, the frame, and the end member illustrated in FIG. 17 viewed from an optical axis direction.
Figure 19:
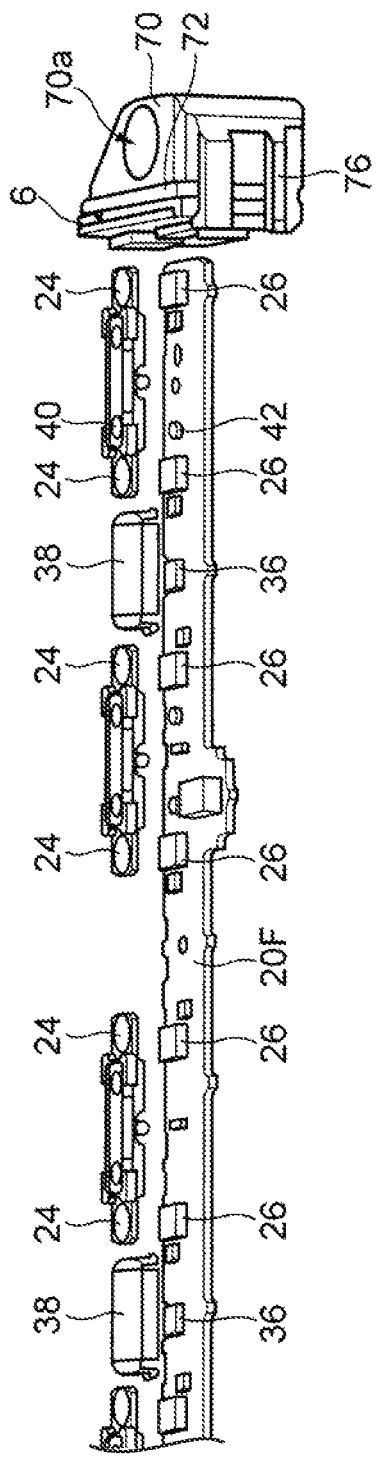
FIG. 19 is a diagram for explaining an arrangement relationship between optical elements (light receiving elements or light projecting elements) and lenses mounted on an optical element substrate of the multi-optical axis photoelectric sensor of the embodiment.

FIGS. 17 to 19 illustrate, as a representative example, the flat type sensor 200F to which the optical unit 16F, the optical element substrate 20F, and the frame 14F are assembled. FIG. 17 is a perspective view viewed obliquely from above. FIG. 18 is a front view of the optical unit 16F. FIG. 19 is a diagram illustrating the relative positional relationship between the optical elements 26 and the lenses 24 on the optical element substrate 20F. In FIGS. 17 to 19, reference sign 38 denotes a display lamp, and reference sign 40 denotes an operation display lamp. Further, reference sign 42 of FIG. 19 denotes a light emitting element for the operation display lamp.

Figure 21:
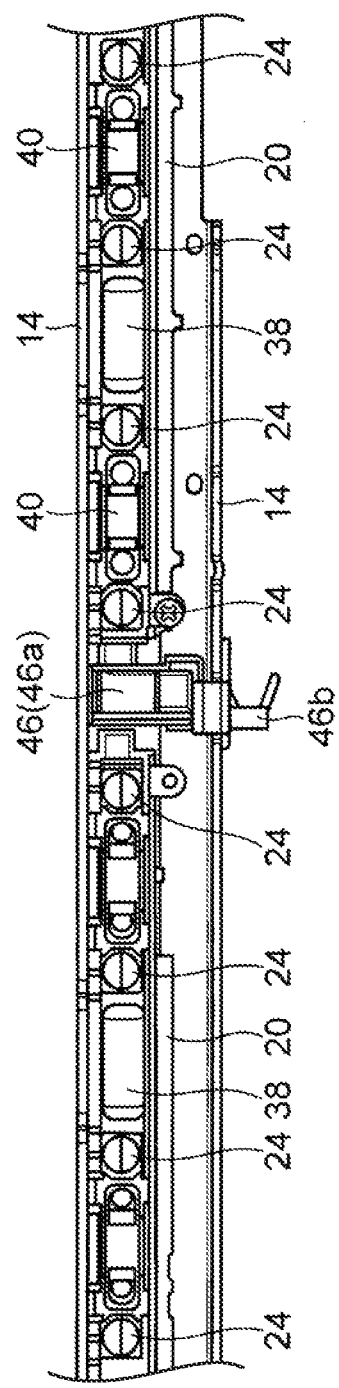
FIG. 21 is a front view of the optical units fixed to the frame viewed from the optical axis direction.

As can be seen well from FIGS. 18 and 21, the display lamps 38 and the operation display lamps 40 are arranged between the lenses 24 (optical axes Oa) which are arranged in a row at a fixed optical axis pitch. Light from these display lamps 38 and operation display lamps 40 can be visually recognized through the visible light transmissive portion 4T (FIGS. 6 and 8) of the case body 4. In the cross section of the case body 4, the detection light passage portion 4M is arranged in the intermediate part of the visible light transmissive portion 4T. In other words, the width occupied by the visible light transmissive portion 4T is larger than that occupied by the detection light passage portion 4M. As can be seen from FIGS. 6 and 8, the visible light transmissive portion 4T extends to the corner of the case body 4 having a generally rectangular cross section, and further extends to a face that is adjacent to the face on which the detection light passage portion 4M is formed. Therefore, light emitted from the display lamps 38 and the operation display lamps 40 can be visually recognized not only through the face on which the detection light passage portion 4M is formed, but also the face adjacent thereto. Therefore, lighting of the display lamps 38 and the operation display lamps 40 can be confirmed from a wide range. That is, while downsizing the multi-optical axis photoelectric sensor 200 by arranging the display lamps 38 and the operation display lamps 40 between the optical axes, it is possible to improve the visibility of lighting of the display lamps 38 and the operation display lamps 40 of the multi-optical axis photoelectric sensor 200. Of course, each of the corners of the case body 4 may be rounded to have an arch-shaped cross section. Further, the case body 4 may have a generally quadrangular shape such as a shape having a generally square cross section.

Further, as can be seen from FIGS. 18 and 21, the display lamps 38 are arranged at an approximately equal pitch from one end part to the other end part in the longitudinal direction of the multi-optical axis photoelectric sensor 200. In other words, the display lamps 38 are evenly arranged in the longitudinal direction of the multi-optical axis photoelectric sensor 200. Therefore, the display lamps 38 can be lit for indicating the propriety of optical axis adjustment, or for indicating an operation instruction to an operator by a control signal from an external device.

Figure 20:
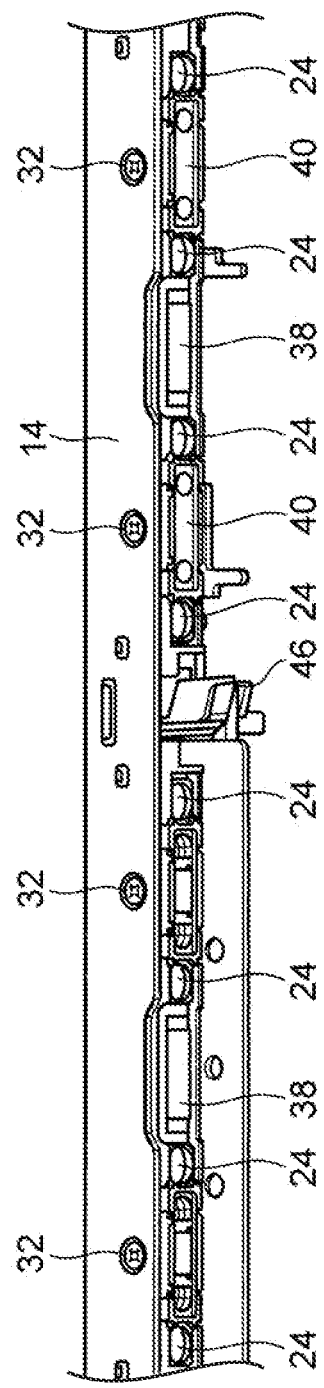
FIG. 20 is a perspective view illustrating a state where the optical units are assembled to the frame and fixed thereto with countersunk head screws.
Figure 22:
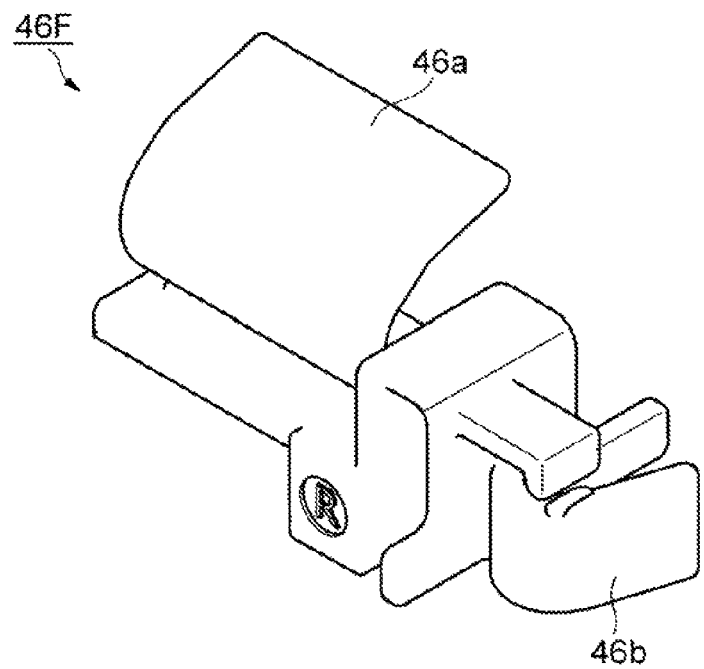
FIG. 22 is a perspective view of a first resilient member (synthetic resin molded article) for the flat type sensor to be fixed to the frame.
Figure 23:
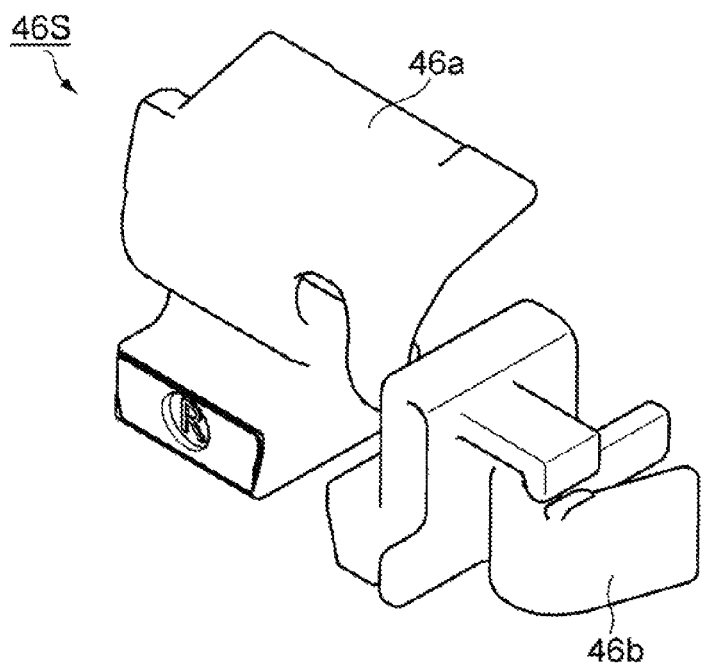
FIG. 23 is a perspective view of a first resilient member (synthetic resin molded article) for the slim type sensor to be fixed to the frame.
Figure 24:
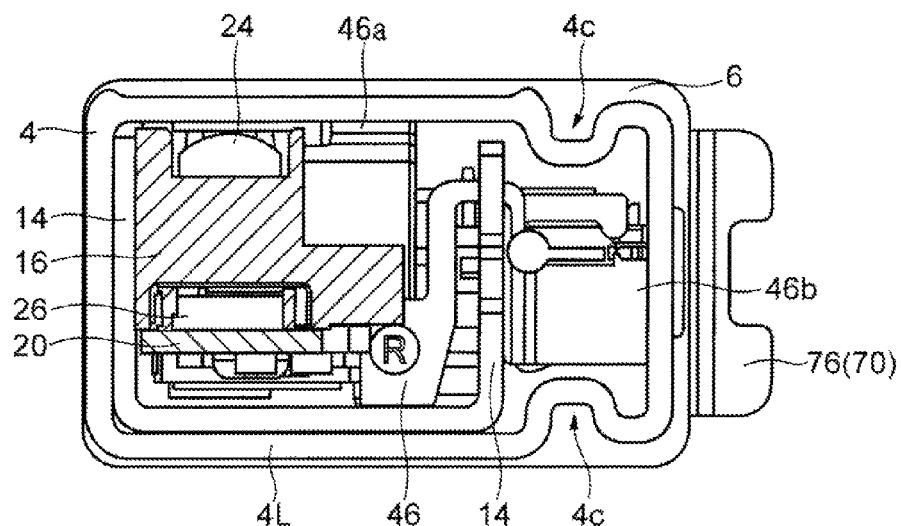
FIG. 24 is a cross-sectional view of the multi-optical axis photoelectric sensor taken by cutting a body part of the first resilient member.
Figure 25:
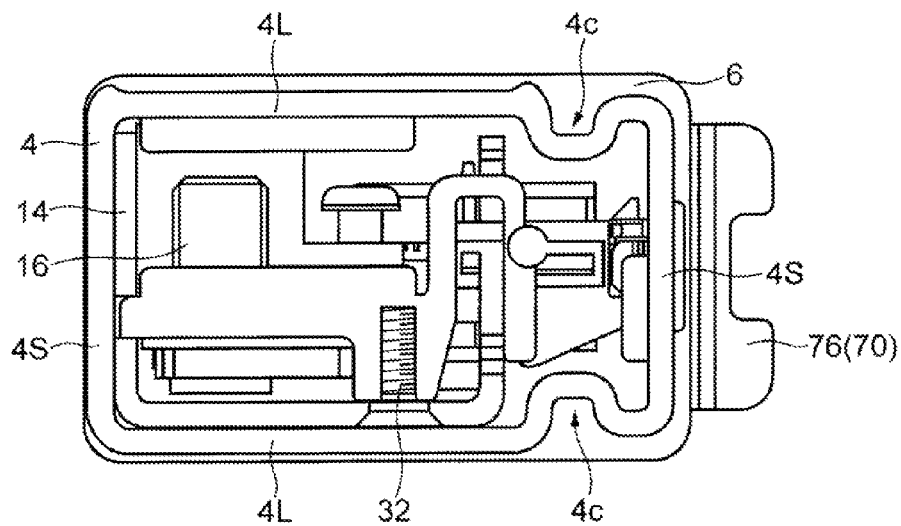
FIG. 25 is a cross-sectional view of the multi-optical axis photoelectric sensor taken by cutting a spring lip part of the first resilient member.

Support Structure of Frame 14:

Referring to FIGS. 9 and 10, a first resilient member 46 is arranged between every adjacent two optical units 16, 16 and between every adjacent two element substrates 20, 20. The first resilient member 46 is fixed to the frame 14 with a screw. As the screw, the countersunk head screw 32 for fixing the optical element substrate 20 to the frame 14 is used. That is, the optical element substrate 20 and the first resilient member 46 are fastened together to the frame 14 with the countersunk head screw 32 (FIGS. 20, 21, and 25). FIGS. 22 and 23 are simplicial diagrams of the first resilient member 46. FIG. 22 illustrates a first resilient member 46F which is assembled to the flat type sensor 200F. FIG. 23 illustrates a first resilient member 46S which is assembled to the slim type sensor 200S. Referring to FIGS. 24 and 25, the first resilient member 46 is a synthetic resin molded article that includes a first spring lip 46a and a second spring lip 46b which is located across a standing wall of the frame 14. In the first resilient member 46 as a resin spring, the first spring lip 46a extends toward a long side 4L of the case body 4 so as to abut on the long side 4L. On the other hand, the second lip 46b extends toward a short side 4S of the case body 4 so as to abut on the short side 4S. FIG. 24 is a diagram of the first resilient member 46 viewed from the longitudinal direction of the multi-optical axis photoelectric sensor 200 inside the multi-optical axis photoelectric sensor 200. FIG. 25 is a partial cross-sectional view of the first resilient member 46. Due to drawing reasons, FIGS. 24 and 25 illustrate a state where the long side 4L of the case body 4 and the frame 14 are in contact with each other. However, actually, the case body 4 and the frame 14 are slightly separated from each other.

Figure 26:
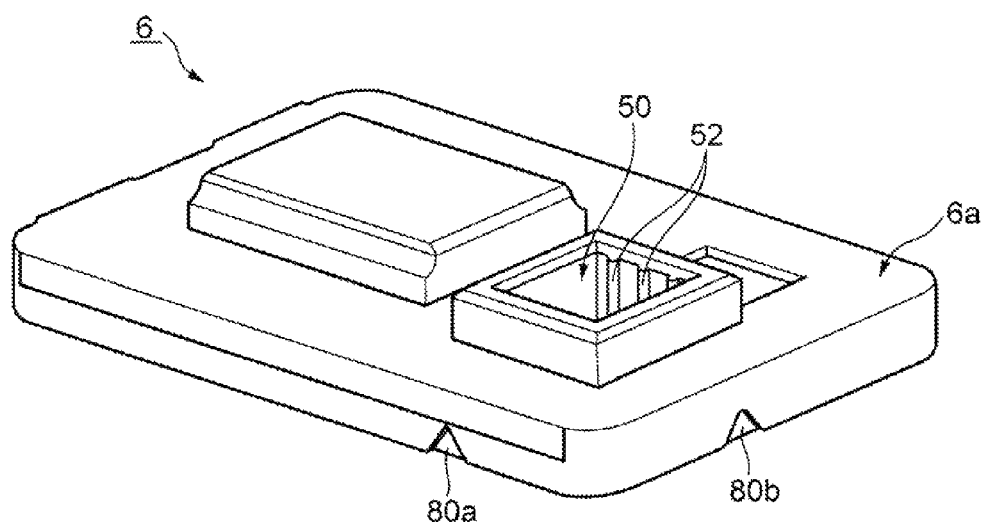
FIG. 26 is a perspective view of the end member with an inner face facing upward.
Figure 27:
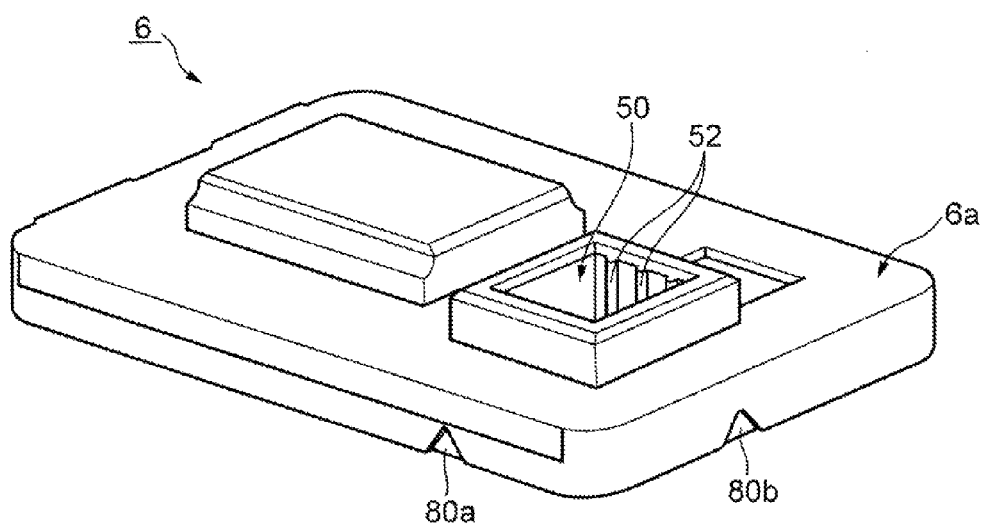
FIG. 27 is a perspective view of the end member with an outer face facing upward.
Figure 28:
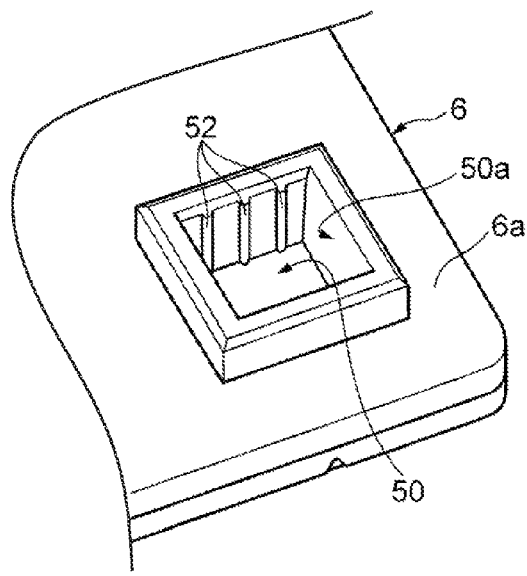
FIG. 28 is an enlarged view of a recess formed on the inner face of the end member.

End Member 6 (FIGS. 19 and 26 to 29):

The end member 6 is a plate-like molded article, and made of a synthetic resin material. FIG. 26 is a diagram of the end member 6 obliquely viewed from above with the inner face facing upward. FIG. 27 is a diagram of the end member 6 obliquely viewed from above with the outer face facing upward. Referring to FIG. 26 which illustrates the inner face 6a of the end member 6, the plate-like end member 6 has a single recess 50 formed on the inner face 6a. FIG. 28 illustrates the recess 50 in an enlarged manner. The end member 6 is applied to both of the flat type sensor 200F and the slim type sensor 200S. The recess 50 has a square cross-sectional shape in a front view. A plurality of projection lines 52 are formed on four wall surfaces 50a of the recess 50. The projection lines 52 extend in the longitudinal direction of the multi-optical axis photoelectric sensor 200, and define a substantial effective cross-sectional area of the recess 50.

Figure 29:
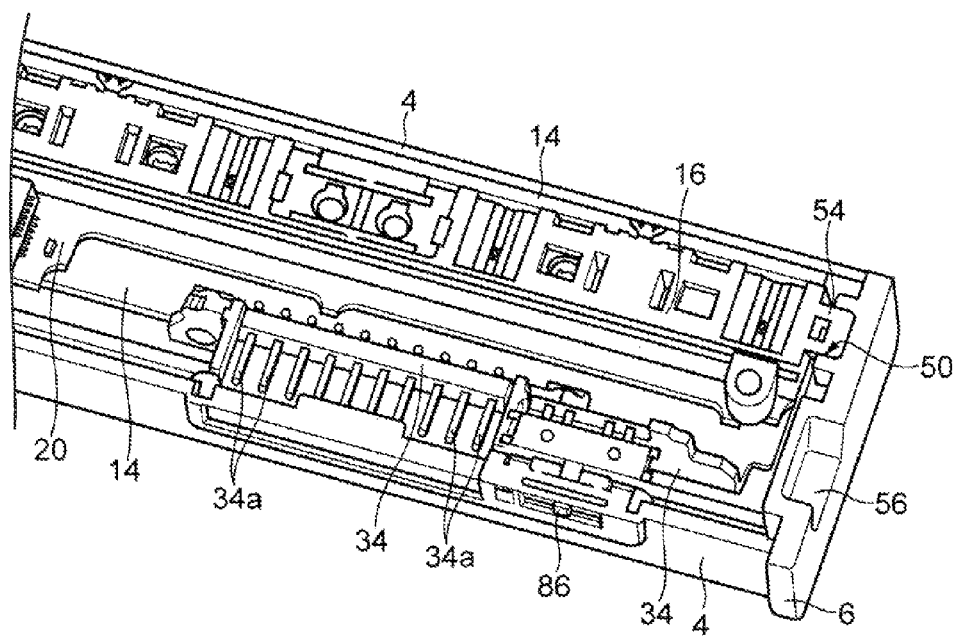
FIG. 29 is a cross-sectional view of one end part of the multi-optical axis photoelectric sensor.

The recess 50 (FIGS. 26 and 28) formed on the inner face 6a of the end member 6 is used for positioning an optical unit 16 which constitutes an end part of the optical component 8 (FIGS. 3 and 4). As can be understood well by referring to FIGS. 11 to 14, a positioning projection 54 is formed on each end of the optical unit 16. The positioning projection 54 is received in the recess 50 formed on the inner face 6a of the end member 6. The cross-sectional shape of the positioning projection 54 is a square shape, and the cross-sectional area thereof is equal to the substantial effective cross-sectional area of the recess 50 of the end member 6. Therefore, the projection 54 of the optical unit 16 can be fitted with the recess 50 of the end member 6, and can displace in the longitudinal direction of the multi-optical axis photoelectric sensor 200 (FIG. 29). The recess 50 and the projection 54 have complementary square cross sections. That is, since the recess 50 and the projection 54 have complementary non-circular cross-sectional shapes, the rotation of the optical unit 16 is restricted by the end member 6.

The plate-like end member 6 is formed into a rectangular shape having substantially the same dimension as the end face of the case body 4. The end member 6 is aligned with the end face of the case body 4 and welded thereto, for example, by laser. By aligning the end member 6 with the end face of the case body 4, the end member 6 can be substantially positioned with respect to the case body 4. A positioner for positioning the end member 6 with respect to the case body 4 may be provided, for example, in the end member 6. Specifically, for example, a positioning projection which is engaged with the end inner face of the case body 4 may be provided on the inner face 6a of the end member 6.

Referring to FIG. 27 which illustrates the outer face 6b of the end member 6, a second recess 56 is formed on the outer face 6b of the end member 6. The second recess 56 has a non-circular shape, for example, an elliptical shape in a front view. A plurality of projection lines 58 are formed also in the second recess 56. Each of the projection lines 58 extends in the longitudinal direction of the multi-optical axis photoelectric sensor 200. The second recess 56 is used for the attachment of an attachment member 70 (described later).

Figure 30:
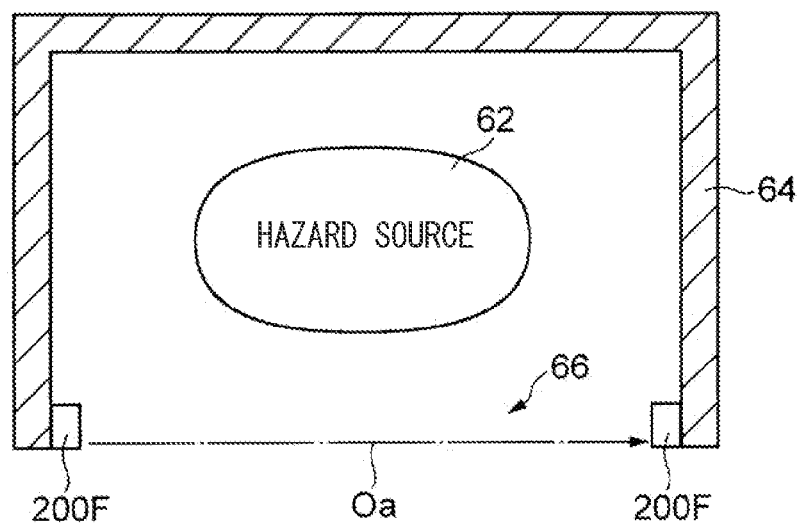
FIG. 30 is a diagram for explaining a placement example of the flat type multi-optical axis photoelectric sensor.
Figure 31:
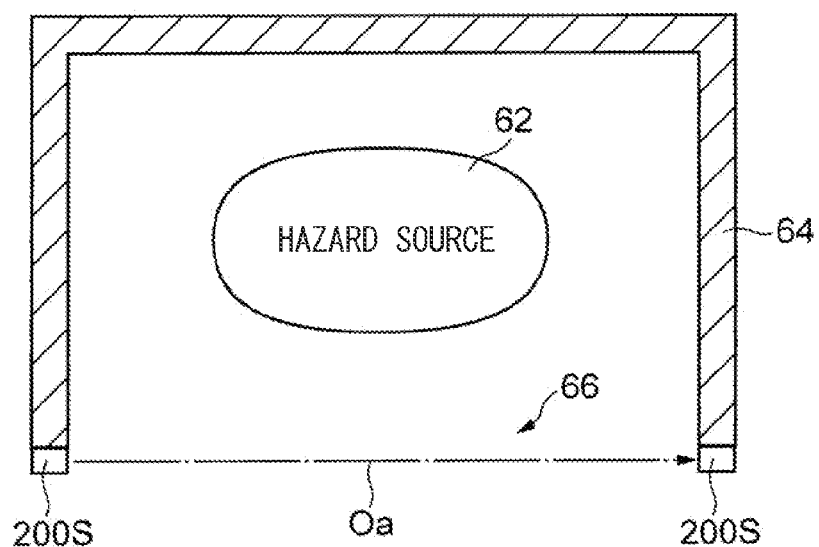
FIG. 31 is a diagram for explaining a placement example of the slim type multi-optical axis photoelectric sensor.

Placement Example of Multi-Optical Axis Photoelectric Sensor 200 (FIGS. 30 and 31):

A placement example of the multi-optical axis photoelectric sensor 200 of the embodiment will be described with reference to FIGS. 30 and 31. FIGS. 30 and 31 are diagrams of an apparatus 62 as a hazard source viewed from above. Three sides of the apparatus 62 are surrounded by a wall 64. The multi-optical axis photoelectric sensors 200 are placed in an opening part 66 of the hazard area.

FIG. 30 illustrates an example in which the flat type sensors 200F are placed on the inner face of the wall 64. Even when the multi-optical axis photoelectric sensors 200 are placed on the inner face of the wall 64 or a pillar, by using the thin flat type sensors 200F, it is possible to reduce the reduction in the opening area of the opening part 66 caused by the placement of the multi-optical axis photoelectric sensors 200 as far as possible.

FIG. 31 illustrates an example in which the slim type sensors 200S are placed on the front face of the wall 64 or a pillar. Even when the multi-optical axis photoelectric sensors 200 are placed on the wall 64 or a pillar, by using the slim type sensors 200S, it is possible to reduce the projection amount of the multi-optical axis photoelectric sensors 200 which project forward from the wall 64 or the pillars. In such placement, the multi-optical axis photoelectric sensors 200 do not narrow the opening of the opening part 66 of the hazard area.

Figure 32:
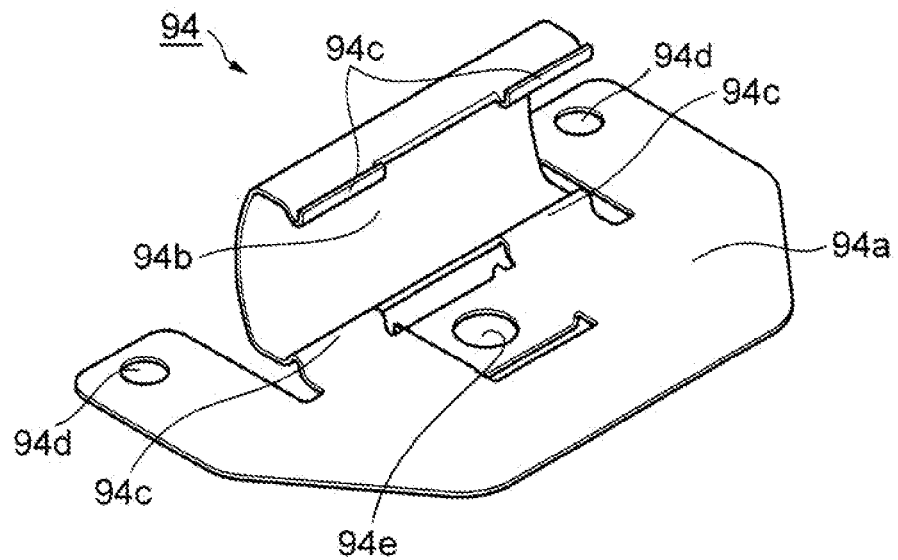
FIG. 32 is a diagram illustrating an example of an auxiliary tool for supporting an intermediate part in the longitudinal direction of the multi-optical axis photoelectric sensor when placing the multi-optical axis photoelectric sensor.
Figure 33:
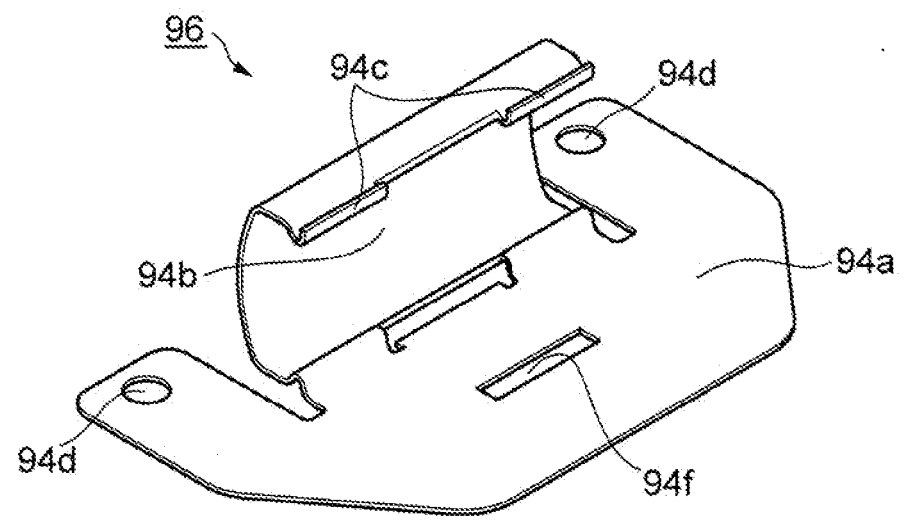
FIG. 33 is a diagram illustrating another example of the auxiliary tool for supporting the intermediate part in the longitudinal direction of the multi-optical axis photoelectric sensor when placing the multi-optical axis photoelectric sensor.

Placement Auxiliary Tool (FIGS. 32 and 33)

When the multi-optical axis photoelectric sensor 200 is a long sensor, even if both ends thereof are fixed, an intermediate part in the longitudinal direction thereof may be warped. Auxiliary tools for preventing the warpage are illustrated in FIGS. 32 and 33. FIG. 32 illustrates a first placement auxiliary tool 94. FIG. 33 illustrates a second placement auxiliary tool 96. The first and second placement auxiliary tools 94, 96 are formed by press-molding a metal plate, and basically have the same configuration. Therefore, the same elements are denoted by the same reference sign. Each of the placement auxiliary tools 94, 96 has a flat base portion 94a and a standing portion 94b standing from the base portion 94a. Further, claws 94c are formed on the base end and the upper end of the standing portion 94b.

Further, two bolt insertion holes 94d which are separated from each other are formed on the base portion 94a. Further, the first placement auxiliary tool 94 has a third bolt insertion hole 94e. These three bolt insertion holes 94d, 94d, 94e are so called loose holes. The first placement auxiliary tool 94 is bolt-fixed to the wall 64 or a pillar using these bolt insertion holes 94d, 94d, 94e. In the second placement auxiliary tool 96, a slit 94f is formed in addition to the two bolt insertion holes 94d, 94d. The second placement auxiliary tool 96 is fixed to the wall 64 or a pillar using the two bolt insertion holes 94d, 94d and the slit 94f.

The first placement auxiliary tool 94 or second placement auxiliary tool 96 is previously fixed to the wall 64 or a pillar. Further, the multi-optical axis photoelectric sensor 200 is unrotatably positioned and fixed to the first placement auxiliary tool 94 or second placement auxiliary tool 96 by engaging the claws 94c of the auxiliary tool 94 or 96 with the pair of grooves 4c of the case body 4.

The first and/or second placement auxiliary tools 94, 96 are appropriately selected depending on a placement face for placing thereon the multi-optical axis photoelectric sensor 200. As necessary, a single or a plurality of placement auxiliary tools 94, 96 are arranged on the wall 64 or a pillar for a single multi-optical axis photoelectric sensor 200.

Figure 34:
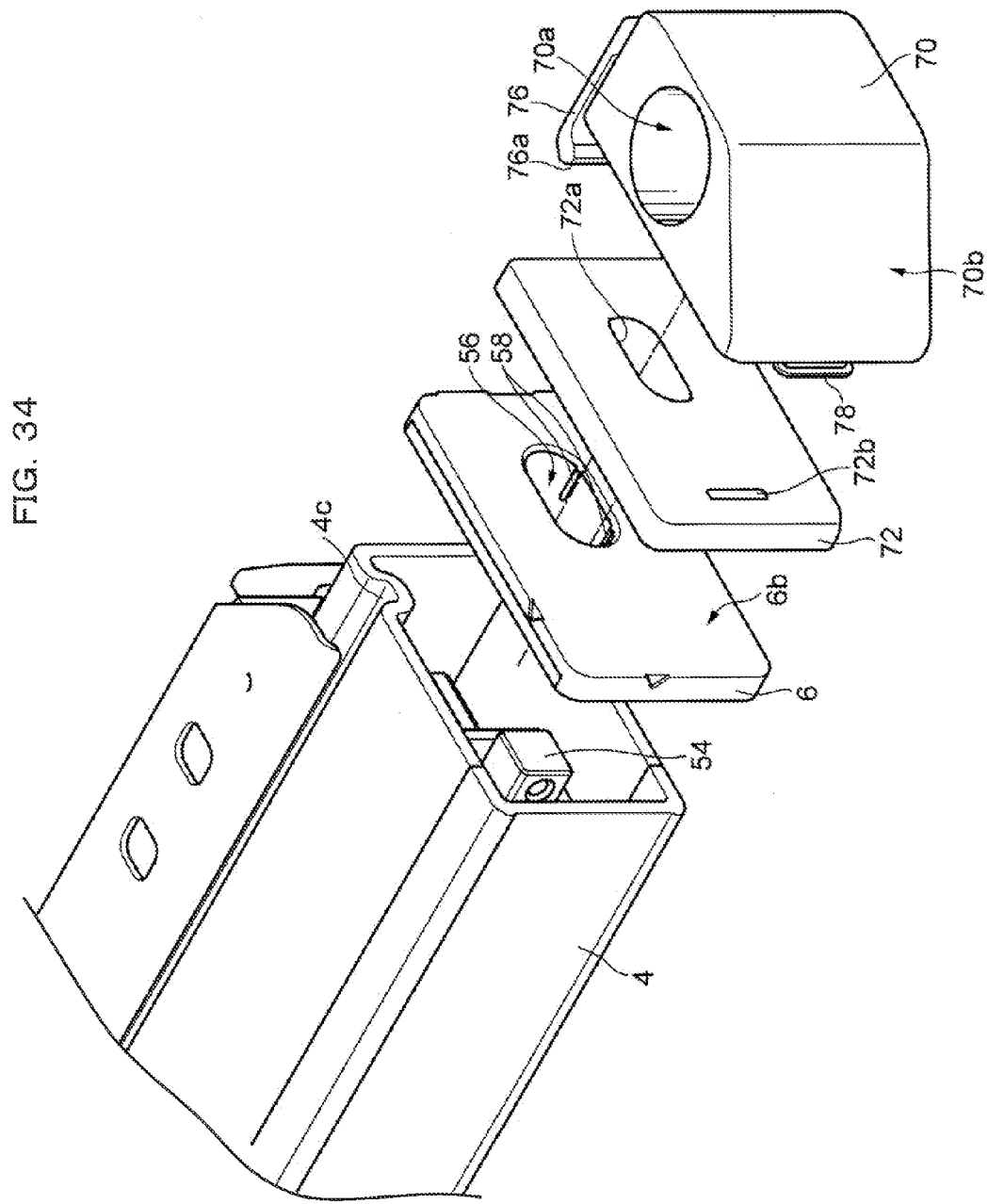
FIG. 34 is an exploded perspective view for explaining an attachment member with an elastic member which can be attached in a one-touch operation to the end member which is laser-welded to the end of the case body of the multi-optical axis photoelectric sensor.

Attachment Member 70 as Attachment (FIGS. 34 and 35):

Referring to FIGS. 1, 2, and 34, on one end and the other end of the multi-optical axis photoelectric sensor 200, attachment members 70 are each detachably fixed to the end member 6 with an elastic member (a cushion member made of rubber, for example) 72 interposed therebetween. The attachment member 70 as an attachment has a through hole 70a which are open on flat faces which face each other and are parallel to each other. The multi-optical axis photoelectric sensor 200 can be fixed to the wall 64 or a pillar (FIGS. 30 and 31) using a bolt as a fastening tool inserted into the through hole 70a. When the attachment member 70 is made of a synthetic resin, a washer is preferably interposed between the attachment member 70 and the placement face, namely, on the bearing surface of the attachment member 70 when placing the multi-optical axis photoelectric sensor 200. By inserting the washer on the bearing surface of the attachment member 70, when the attachment member 70 made of a synthetic resin is fixed to the placement face with a bolt, it is possible to prevent the attachment member 70 from being damaged due to the fastening torque of the bolt. The attachment member 70 has an inclined face 70b having an inclination angle of 45°. When two adjacent multi-optical axis photoelectric sensors 200 are arranged in perpendicular to each other, the two adjacent multi-optical axis photoelectric sensors 200 can be arranged in an L shape by allowing the inclined faces 70b to abut on each other. It is preferred to design the attachment member 70 so that a pitch between an optical axis on an end of one of the two adjacent multi-optical axis photoelectric sensors 200 and an optical axis on an end of the other one of the two adjacent multi-optical axis photoelectric sensors 200 in the L-shaped arrangement becomes equal to or smaller than the optical axis pitch of the multi-optical axis photoelectric sensor 200.

Figure 35:
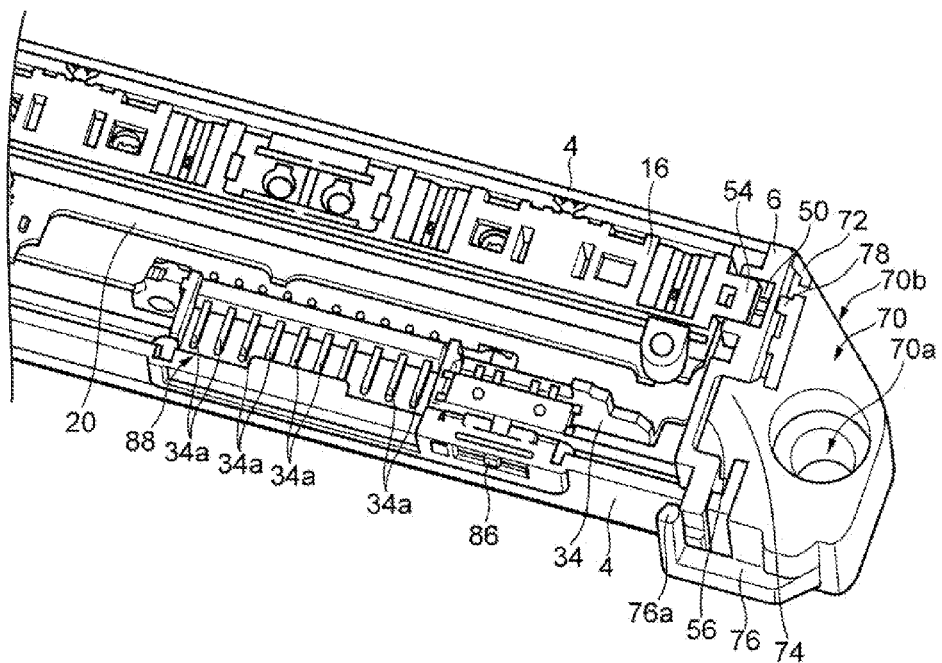
FIG. 35 is a cross-sectional view of one end part of the multi-optical axis photoelectric sensor to which the attachment member is attached.

The attachment member 70 has a projection 74 which is formed on a face facing the end member 6 and projects toward the end member 6 (FIG. 35). The projection 74 has a shape complementary to the shape of the second recess 56 (FIG. 27) of the end member 6, and is recess-projection fitted with the second recess 56 so as to be detachable in the longitudinal direction of the multi-optical axis photoelectric sensor 200. As can be seen from FIG. 27, the second recess 56 of the end member 6 has a non-circular shape, for example, an elliptical shape in a front view. Therefore, the projection 74 of the attachment member 70 also has an elliptical cross-sectional shape in a front view. Therefore, by the recess-projection fitting between the projection 74 and the second recess 56 (FIG. 35), the rotation of the attachment member 70 is restricted by the end member 6. Accordingly, the relative relationship between the axis of the through hole 70a of the attachment member 70 (the axis of a bolt to be inserted into the through hole 70a) and the optical axis Oa can be established as a predetermined promised relationship.

The attachment member 70 is a molded article. Although the material of the attachment member 70 may be a metal, a synthetic resin is used in the embodiment. As a most preferred mode, the attachment member 70 as an attachment has a hook 76, and the attachment member 70 can be fixed in a one-touch operation to the end member 6 using the hook 76 without using a screw. Of course, the attachment member 70 may be fixed to the end member 6 using a screw, or the attachment member 70 and the end member 6 may also be formed as an integrally molded article (one-piece article).

Figure 36:
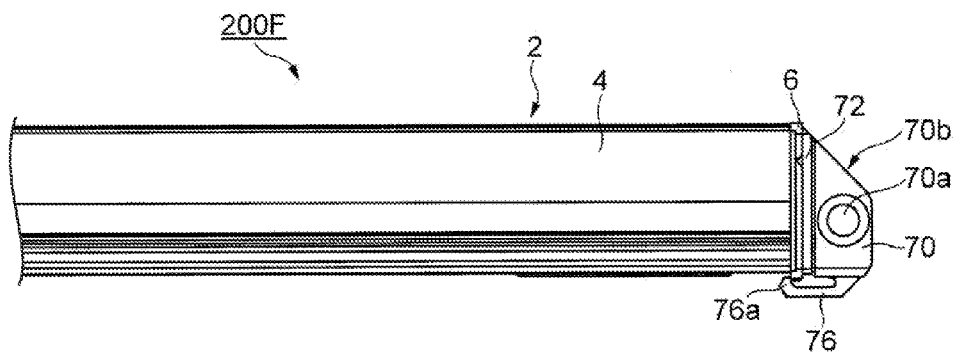
FIG. 36 is a diagram of the one end part of the flat type multi-optical axis photoelectric sensor to which the attachment member is attached viewed from above.

As described above, the end member 6 is laser-welded to the case body 4. The end member 6 has a size that allows one end thereof to project outward from the end face of the case body 4 (FIG. 35). A claw 76a of the hook 76 is locked with the outwardly-projecting end of the end member 6 (FIGS. 35 and 36). That is, when projection 74 of the attachment member 70 is pushed into the second recess 56 of the end member 6, the hook 76 is warped and deformed, and the claw 76a climbs on the edge of the outwardly-projecting end of the end member 6 in the process of the pushing-in operation. When the attachment member 70 is further pushed into the second recess 56, the claw 76a climbs over the edge of the end member 6. Along with the climbing-over action, the hook 76 is elastically returned, and the claw 76a is thereby engaged with the outwardly-projecting end of the end member 6. The additional pushing-in operation involves compressive deformation of the elastic member 72 which is interposed between the end member 6 and the attachment member 70. Once the hook 76 is engaged with the end member 6, the engagement state between the hook 76 and the end member 6 is maintained by the restoring force of the elastic member 72. Of course, by performing an operation for pulling out the attachment member 70 while applying an external force in the direction for expanding the hook 76, the attachment member 70 can be removed.

The elastic member 72 has a role of absorbing expansion and contraction in the longitudinal direction of the case body 4 caused by temperature change. For example, when the case body 4 expands in the longitudinal direction due to thermal expansion, the expansion in the longitudinal direction of the case body 4 caused by temperature change can be absorbed by the elastic member 72 being compressed.

As can be best understood from FIG. 34, needless to say, a through hole 72a which allows the projection 74 of the attachment member 70 to pass therethrough is formed on the elastic member 72. Further, the elastic member 72 has a slit 72b which is formed on one end part, namely, the end part opposite to the hook 76 of the attachment member 70. The elastic member 72 is assembled to the attachment member 70 using the slit 72b.

The attachment member 70 as an attachment will further be described with reference to FIG. 34. The attachment member 70 has a projection piece 78 which is formed on the end opposite to the hook 76. By inserting the projection piece 78 into the slit 72b of the elastic member 72, the elastic member 72 is prevented from falling off the attachment member 70.

Figure 37:
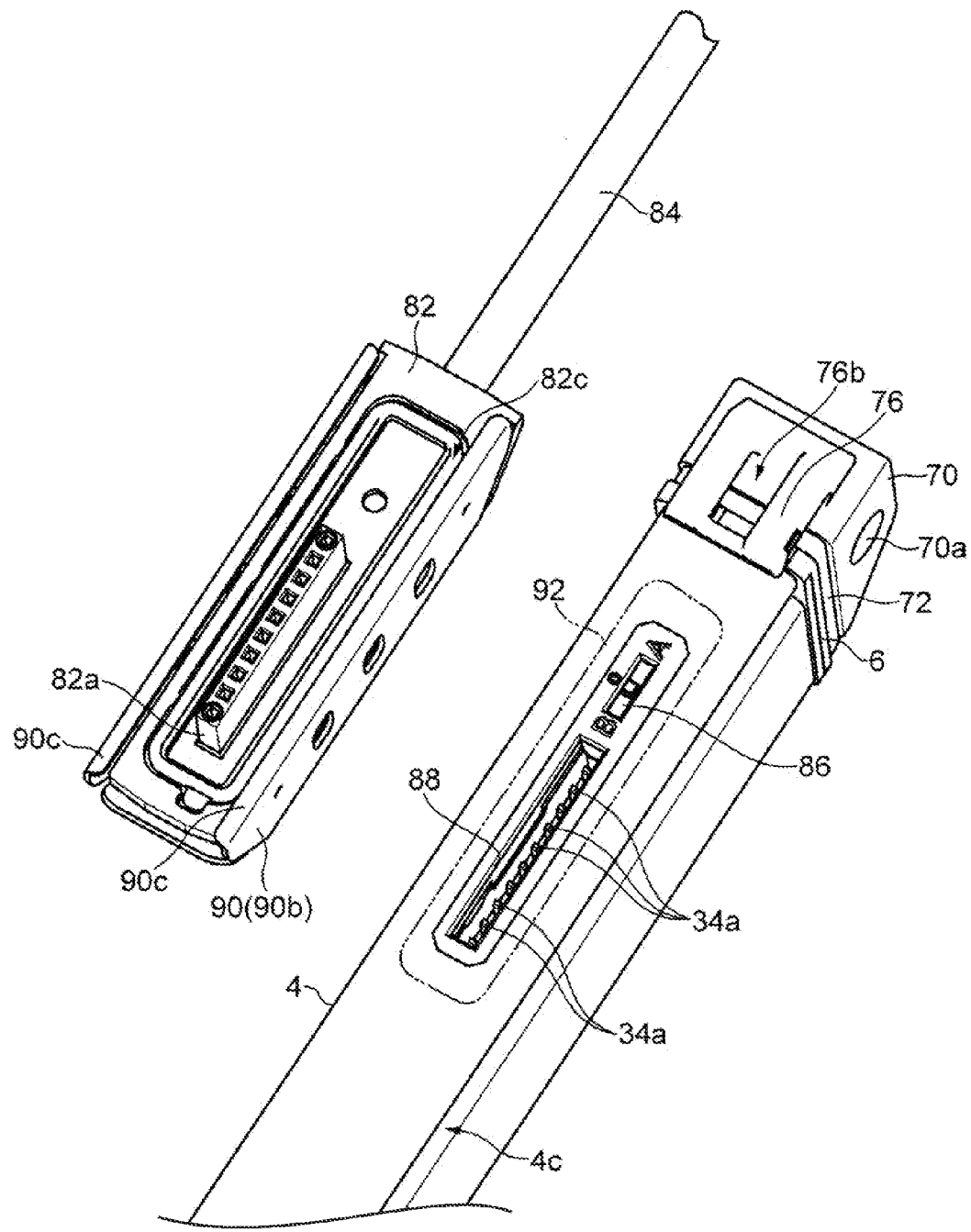
FIG. 37 is a diagram for explaining a connector part provided on the end part of the multi-optical axis photoelectric sensor and an external connector which can be connected to the connector part.
Figure 38:
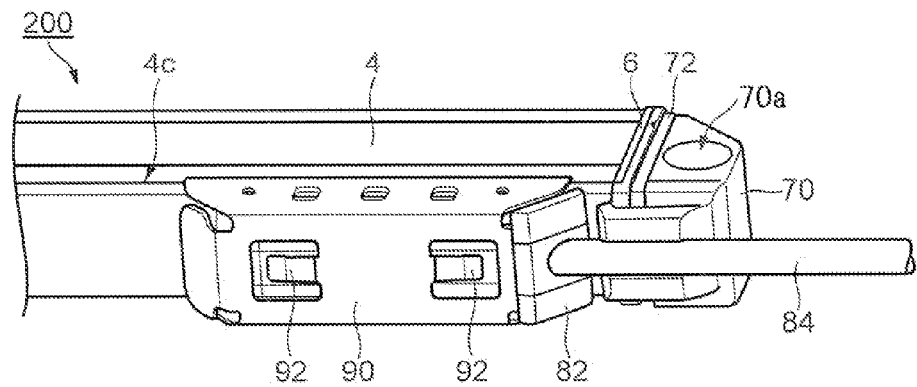
FIG. 38 is a diagram for explaining a state of the multi-optical axis photoelectric sensor to which the external connector is connected.

Referring to FIGS. 37 and 38, the hook 76 of the attachment member 70 has a cable insertion portion 76b which is formed in an intermediate part of the hook 76 and extends in the longitudinal direction of the multi-optical axis photoelectric sensor 200 in a plan view. The external cable 84 is arranged on the cable insertion portion 76b. That is, the hook 76 has a fork shape in a plan view, and the cable 84 of the connector 82 is housed in the cable insertion portion 76b of the hook 76.

Reference sign 80 illustrated in FIGS. 26, 27 and the like denotes a mark formed by, for example, cutout. The end member 6 is used in both of the flat type sensor 200F and the slim type sensor 200S. Therefore, it is preferred to provide at least any one of a first mark 80a and a second mark 80b for the end member 6. The first mark 80a indicates the side in which an optical axis row of the flat type sensor 200F exists. The second mark 80b indicates the side in which an optical axis row of the slim type sensor 200S exists.

The multi-optical axis photoelectric sensor 200 may be sold without the attachment member 70, or may also be sold with the attachment member 70 assembled thereto. When the multi-optical axis photoelectric sensor 200 is sold with the attachment member 70 previously assembled thereto as illustrated in FIGS. 1 and 2, a user can immediately place the obtained multi-optical axis photoelectric sensor 200 in the mode as described with reference to FIGS. 30 and 31. Of course, since the attachment member 70 is integrated with the multi-optical axis photoelectric sensor 200, when a reference is correctly set on the placement face of the wall 64 or a pillar surrounding a hazard source on which the multi-optical axis photoelectric sensor 200 is to be placed, the multi-optical axis photoelectric sensor 200 can be operated immediately after the placement without performing adjustment of optical axes thereof. In a conventional placement operation using a metal fitting, even if the wall 64 or a pillar is provided with a placement face on which the reference is correctly set, an optical axis adjustment operation is essential. On the other hand, in the multi-optical axis photoelectric sensor 200 of the embodiment, by shipping the multi-optical axis photoelectric sensor 200 to which the attachment member 70 is previously assembled, a use can operate the obtained multi-optical axis photoelectric sensor 200 immediately after the placement thereof. Further, a placement operation of the multi-optical axis photoelectric sensor 200 can be simplified. This is one of advantages obtained by designing the attachment member 70 and the optical axes Oa using a common reference (end member 6).

In particular, in the multi-optical axis photoelectric sensor 200 of the embodiment, the optical component 8, namely, the optical axes Oa are positioned using the end member 6 as a reference, and the attachment member 70 is positioned using the end member 6 as a reference as described above. Therefore, the attachment member 70 is in an aligned state with the optical axes Oa through the end member 6. This is also a factor that makes it possible to contribute to the simplification of the placement operation of the multi-optical axis photoelectric sensor 200 using the attachment member 70.

Cable Connection (FIGS. 1, 2, and 37):

Reference sign 82 illustrated in FIGS. 1 and 2 denotes an external connector. In FIGS. 1 and 2, electrical connection between a plurality of multi-optical axis photoelectric sensors 200 and electrical connection between the multi-optical axis photoelectric sensor 200 and a control device are performed through the cable 84 (FIG. 37) extending from the external connector 82. Further, the cable 84 may be integrated with the multi-optical axis photoelectric sensor 200. In this case, it is preferred that the cable 84 extends inside and outside the multi-optical axis photoelectric sensor 200 through the through hole of the end member 6.

As can be best understood from FIGS. 29 and 35, a manual switch 86 is disposed in adjacent to a connector pin 34a of the extension connector substrate 34. The manual switch 86 includes a slide type switch. Operation modes of the multi-optical axis photoelectric sensor 200 can be switched by the switch 86. The case body 4 has a connector opening 88 which receives the external connector 82 and is formed at a position facing the connector pin 34a. The manual switch 86 is attached to one end part of the connector opening 88 (FIG. 37).

A body of the external connector 82 is a synthetic resin molded article. The external connector 82 is constructed by incorporating a connector component 82a (FIG. 37) into the body thereof. The external connector 82 has an elongated box-like shape having a width dimension that is slightly shorter than the short side 4S of the case body 4 of the multi-optical axis photoelectric sensor 200. A cover member 90 is prepared separately from the external connector 82. The upper face and both side faces of the external connector 82 are surrounded by the cover member 90.

Figure 39:
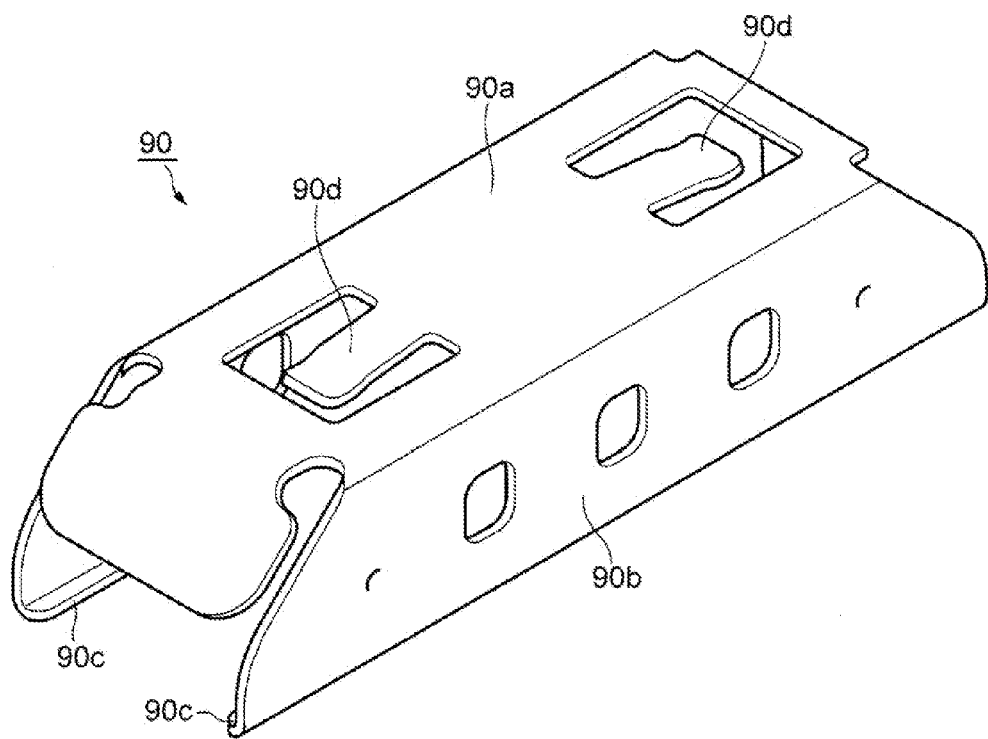
FIG. 39 is a perspective view of a cover member for preventing the external connector from falling off.

Cover Member 90 (FIGS. 39 and 40):

FIG. 39 is a perspective view of the external connector cover member 90. The external connector cover member 90 is formed by press-molding a metallic plate material. The cover member 90 has a top face 90a which corresponds to the upper face of the external connector 82 and leg portions 90b which extend downward from the respective side edges of the top face 90a. Each of the leg portions 90b has a height dimension that is larger than the height dimension of the external connector 82. A claw 90c which is molded to be bent inward is formed on the lower end of each of the leg portions 90b. Further, two spring pieces 90d which are formed by being cut and raised are formed on the top face 90a. The two spring pieces 90d, 90d are arranged so as to be separated from each other in the longitudinal direction of the external connector 82.

Figure 40:
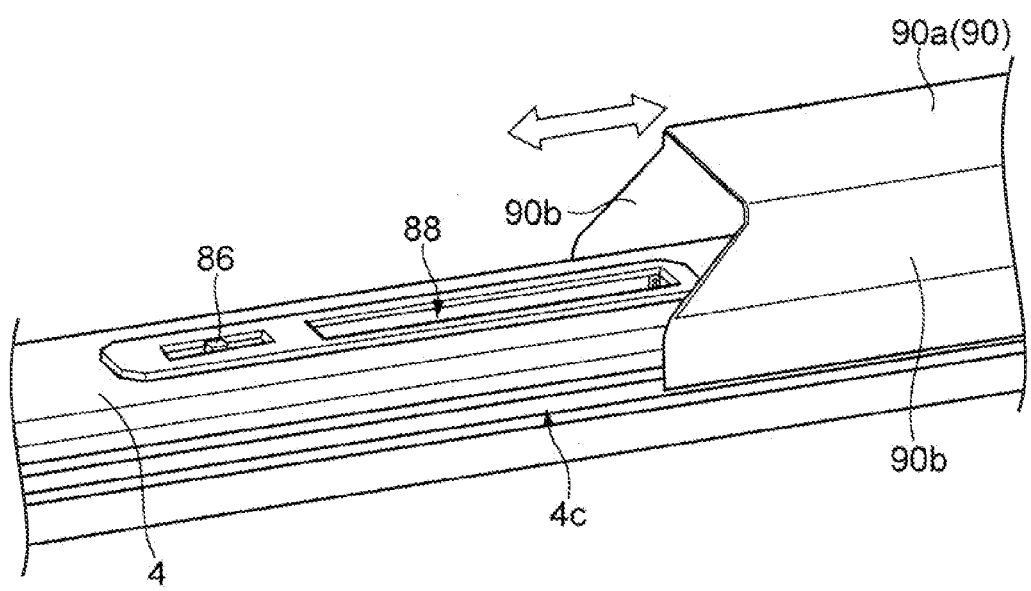
FIG. 40 is a diagram for explaining a state where the cover member is assembled to the multi-optical axis photoelectric sensor.

The external connector cover member 90 is previously attached to the case body 4 (FIG. 40). The attachment is performed by locking the claws 90c of the cover member 90 with the grooves 4c of the case body 4. The cover member 90 attached to the case body 4 is guided by the grooves 4c, and thereby slidable in the longitudinal direction of the multi-optical axis photoelectric sensor 200.

As can be best understood from FIG. 38, the external connector 82 has a length dimension and a width dimension enough to completely cover the connector opening 88 of the case body 4. Reference sign 82c of FIG. 37 denotes a recessed part which is formed on the bottom face of the external connector 82. A seal material (water stop packing, which is not illustrated) is attached to the recessed part 82c. After connector-coupling the external connector 82 to the multi-optical axis photoelectric sensor 200, the external connector cover member 90 is slid to surround the external connector 82 by the cover member 90. In a state where the external connector 82 is surrounded by the cover member 90, it is possible to prevent the external connector 82 from falling off the multi-optical axis photoelectric sensor 200 by virtue of the cover member 90.

Further, the seal material attached to the recessed part 82c of the external connector 82 is brought to be close contact with the area around the connector opening 88 of the case body 4. This close contact state is maintained by the two spring pieces 90d (FIG. 39) of the connector cover member 90. That is, the external connector 82 is biased by the spring pieces 90d of the cover member 90 in a direction approaching the case body 4. A virtual line 92 of FIG. 37 indicates an IP line. As can be seen From FIG. 37, the IP line surrounds a connector coupling part and the manual switch 86 for the mode switching.

As a modification of the cover member 90, there may be employed a configuration obtained such that, after the external connector 82 is connector-coupled to the multi-optical axis photoelectric sensor 200, the cover member 90 is attached to snap-engage the claws 90c of the cover member 90 with the grooves 4c of the case body 4.

The above cover member 90 is merely an example. Further, a technical idea such as sealing the connector opening 88 of the case body 4 while preventing the external connector 82 from falling off is not limited to the case where the case body 4 is an extrusion-molded article. The above technical idea can be applied to a sensor case which is made of a metal or a synthetic resin and provided with the connector opening 88. In the above example, the cover member 90 has a locking portion (claws 90c) which can be engaged with and disengaged from the case body 4, and the cover member 90 is snap-engaged with the case body 4 by the locking portion. Therefore, the case body 4 is only required to have a step (grooves 4c) which is engaged with the locking portion (claws 90) of the cover member 90. Further, when employing a configuration in which the cover member 90 is united with the external connector 82 not by the snap-engagement, but by a slide method, the spring property of the leg portions 90b of the cover member 90 is not essential, and the leg portions 90b may not have a spring property.

Further, in the above example, there is employed the configuration in which the external connector 82 is biased in the pushing-in direction by the spring pieces 90d which are formed on the top face 90a of the cover member 90 by being cut and raised. However, for example, an elastic member (rubber) may be arranged on the top face 90a of the cover member 90, and the external connector 82 may be biased in the pushing-in direction by the elastic member.

Although the cover member 90 is formed by press-processing a metal plate in view of cost, the cover member may, of course, be a synthetic resin molded article. In the above embodiment, as described above, there is employed the configuration in which the recessed part 82c is provided in the external connector 82, and the seal material is attached to the recessed part 82c to thereby bring the seal material to be close contact with the case body 4. However, a structure in which a seal material is attached to the case body 4 may also be employed.

The preferred embodiment of the present invention has been described above. In the described embodiment, when all optical axes of a single multi-optical axis photoelectric sensor 200 are light receiving element optical axes, the multi-optical axis photoelectric sensor 200 functions as an optical receiver. On the other hand, when all optical axes are light projecting element optical axes, the multi-optical axis photoelectric sensor 200 functions as an optical projector. As a modification, there may be employed a configuration in which half of the optical elements 26 included in a single multi-optical axis photoelectric sensor 200 are composed of light receiving elements, and the other half of the optical elements 26 are composed of light projecting elements so that a half of the single multi-optical axis photoelectric sensor 200 functions as an optical receiver, and the other half of the single multi-optical axis photoelectric sensor 200 functions as an optical projector.

What is claimed is:

1. A multi-optical axis photoelectric sensor comprising:
   a plurality of optical axes arranged at a predetermined pitch;
   a case body formed to have an open first end and an open second end, the case body having the same cross-sectional shape in a longitudinal direction of the multi-optical axis photoelectric sensor;
   end members attached to the first end and the second end of the case body and each formed of a molded article for closing an opening on each of the first and second ends; and
   an optical component for defining a spread angle of each of the optical axes, the optical component being arranged from the first end to the second end of the case body so as to be separated from an inner face of the case body,
   wherein the optical component and the end members are directly or indirectly physically engaged with each other to unrotatably position the optical component by the end members, and a reference for positioning the optical axes is the end members,
   wherein the optical component and the end members are relatively unrotatably recess-projection fitted with each other, and the recess projection fitting is insertable and removable in the longitudinal direction of the multi-optical axis photoelectric sensor.

2. A multi-optical axis photoelectric sensor comprising:
   a plurality of optical axes arranged at a predetermined pitch;
   a case body formed to have an open first end and an open second end, the case body having the same cross-sectional shape in a longitudinal direction of the multi-optical axis photoelectric sensor;
   end members attached to the first end and the second end of the case body and each formed of a molded article for closing an opening on each of the first and second ends;
   an optical component for defining a spread angle of each of the optical axes, the optical component being arranged from the first end to the second end of the case body so as to be separated from an inner face of the case body,
   wherein the optical component and the end members are directly or indirectly physically engaged with each other to unrotatably position the optical component by the end members, and a reference for positioning the optical axes is the end members, and
   a rigid member continuously extending in the longitudinal direction from one end part to the other end part of the multi-optical axis photoelectric sensor, wherein the optical component is positioned on the rigid member, and the rigid member includes a frame formed of a metal plate formed into a three-dimensional shape.

3. The multi-optical axis photoelectric sensor according to claim 2, wherein the optical component and the end members are relatively unrotatably recess-projection fitted with each other, and the recess-projection fitting is insertable and removable in the longitudinal direction of the multi-optical axis photoelectric sensor.

4. The multi-optical axis photoelectric sensor according to claim 2, wherein the case body is an extrusion-molded article made of a synthetic resin.

5. The multi-optical axis photoelectric sensor according to claim 4, wherein the case body has a closed cross section.

6. The multi-optical axis photoelectric sensor according to claim 5, wherein the case body has a generally rectangular cross-sectional shape having two long sides facing each other and two short sides facing each other, and grooves are formed on end parts of the two long sides.

7. The multi-optical axis photoelectric sensor according to claim 2, wherein the optical component includes a plurality of optical units, and each of the optical units has a plurality of optical axes.

8. The multi-optical axis photoelectric sensor according to claim 7, wherein each of the optical units has lenses for the respective optical axes.

9. The multi-optical axis photoelectric sensor according to claim 7, wherein every two adjacent ones of the optical units are separated from each other in the longitudinal direction of the multi-optical axis photoelectric sensor.

10. The multi-optical axis photoelectric sensor according to claim 9, wherein each of the optical units is fixed to the metal plate with a countersunk head screw, and a screw head of the countersunk head screw does not project outward from an outer plate face of the metal plate.

11. The multi-optical axis photoelectric sensor according to claim 10, further comprising:
an optical element substrate fixed to each of the optical units, wherein an optical element is mounted on the optical element substrate.

12. The multi-optical axis photoelectric sensor according to claim 9, further comprising:
a spring member arranged between every two adjacent ones of the optical units and fixed to the metal plate, wherein a spring lip of the spring member abuts on the inner face of the case body.

13. A multi-optical axis photoelectric sensor comprising:
a plurality of optical axes arranged at a predetermined pitch;
a case body formed to have an open first end and an open second end, the case body having the same cross-sectional shape in a longitudinal direction of the multi-optical axis photoelectric sensor;
end members attached to the first end and the second end of the case body and each formed of a molded article for closing an opening on each of the first and second ends; and
an optical component for defining a spread angle of each of the optical axes, the optical component being arranged from the first end to the second end of the case body so as to be separated from an inner face of the case body, wherein the optical component and the end members are directly or indirectly physically engaged with each other to unrotatably position the optical component by the end members, and a reference for positioning the optical axes is the end members,
wherein the optical component includes a plurality of optical units, and each of the optical units has a plurality of optical axes.

14. The multi-optical axis photoelectric sensor according to claim 13, wherein each of the optical units has lenses for the respective optical axes.

15. The multi-optical axis photoelectric sensor according to claim 13, wherein every two adjacent ones of the optical units are separated from each other in the longitudinal direction of the multi-optical axis photoelectric sensor.

16. The multi-optical axis photoelectric sensor according to claim 15, wherein each of the optical units is fixed to the metal plate with a countersunk head screw, and a screw head of the countersunk head screw does not project outward from an outer plate face of the metal plate.

17. The multi-optical axis photoelectric sensor according to claim 16, further comprising: an optical element substrate fixed to each of the optical units, wherein an optical element is mounted on the optical element substrate.

18. The multi-optical axis photoelectric sensor according to claim 15, further comprising: a spring member arranged between every two adjacent ones of the optical units and fixed to the metal plate, wherein a spring lip of the spring member abuts on the inner face of the case body.

* * * * *